United States Patent
Yang et al.

(10) Patent No.: US 11,877,240 B2
(45) Date of Patent: Jan. 16, 2024

(54) CONSIDERATIONS FOR SIDELINK (SL) WAKE UP SIGNALS (WUSS)

(71) Applicant: QUALCOMM Incorporated, San Diego, CA (US)

(72) Inventors: Wei Yang, San Diego, CA (US); Seyedkianoush Hosseini, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 109 days.

(21) Appl. No.: 17/166,997

(22) Filed: Feb. 3, 2021

(65) Prior Publication Data
US 2022/0248327 A1    Aug. 4, 2022

(51) Int. Cl.
*H04W 52/02* (2009.01)
*H04W 72/02* (2009.01)
*H04W 72/0446* (2023.01)
*H04W 72/0453* (2023.01)
*H04W 76/11* (2018.01)
*H04W 76/28* (2018.01)

(52) U.S. Cl.
CPC ....... *H04W 52/0229* (2013.01); *H04W 72/02* (2013.01); *H04W 72/0446* (2013.01); *H04W 72/0453* (2013.01); *H04W 76/11* (2018.02); *H04W 76/28* (2018.02)

(58) Field of Classification Search
CPC . H04W 52/0229; H04W 76/28; H04W 76/11; H04W 72/02; H04W 72/0446; H04W 72/0453

USPC ......................................................... 370/329
See application file for complete search history.

(56) References Cited

U.S. PATENT DOCUMENTS

| 10,849,068 | B2 * | 11/2020 | Liu | ............ H04L 5/0053 |
|---|---|---|---|---|
| 2020/0053647 | A1 | 2/2020 | Chae et al. | |
| 2022/0279496 | A1 * | 9/2022 | Hahn | ............ H04W 4/40 |
| 2022/0377671 | A1 * | 11/2022 | Höglund | ............ H04W 68/00 |

FOREIGN PATENT DOCUMENTS

| WO | WO-2020081466 A1 * | 4/2020 | ....... H04J 13/0029 |
|---|---|---|---|
| WO | WO-2021062400 A1 * | 4/2021 | ....... H04W 24/08 |
| WO | WO-2021066726 A1 * | 4/2021 | ....... H04W 52/0235 |
| WO | WO-2021098100 A1 * | 5/2021 | |
| WO | WO-2022086427 A1 * | 4/2022 | |

OTHER PUBLICATIONS 63104328P (Year: 2020).*

(Continued)

*Primary Examiner* — Intekhaab A Siddiquee
(74) *Attorney, Agent, or Firm* — Patterson & Sheridan LLP

(57) ABSTRACT

Certain aspects of the present disclosure relate to wireless communications, and more particularly, to techniques for sidelink (SL) power saving using SL wake up signals (WUSs). A method that may be performed by a user equipment (UE) includes determining resources for SL WUS transmissions from a second UE, based on a WUS resource configuration, monitoring the resources for an SL WUS from the second UE, and participating in SL communications with the second UE if an SL WUS is detected during the monitoring.

30 Claims, 19 Drawing Sheets

(56) References Cited

OTHER PUBLICATIONS

Intel Corporation: "Sidelink Enhancements for UE Power Saving", 3GPP TSG RAN WG1 Meeting #102-E, R1-2005896, 3rd Generation Partnership Project, Mobile Competence Centre, 650, Route Des Lucioles, F-06921, Sophia-Antipolis Cedex, France, vol. RAN WG1, No. e-Meeting, 20200817-20200828, Aug. 8, 2020, XP051917798, 9 Pages.
International Search Report and Written Opinion—PCT/US2021/063534—ISA/EPO—dated Jun. 1, 2022.

\* cited by examiner

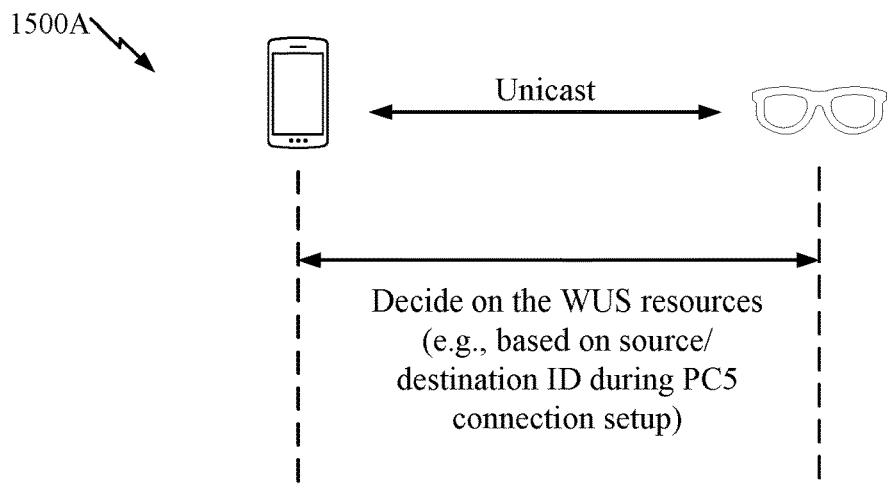
FIG. 15A
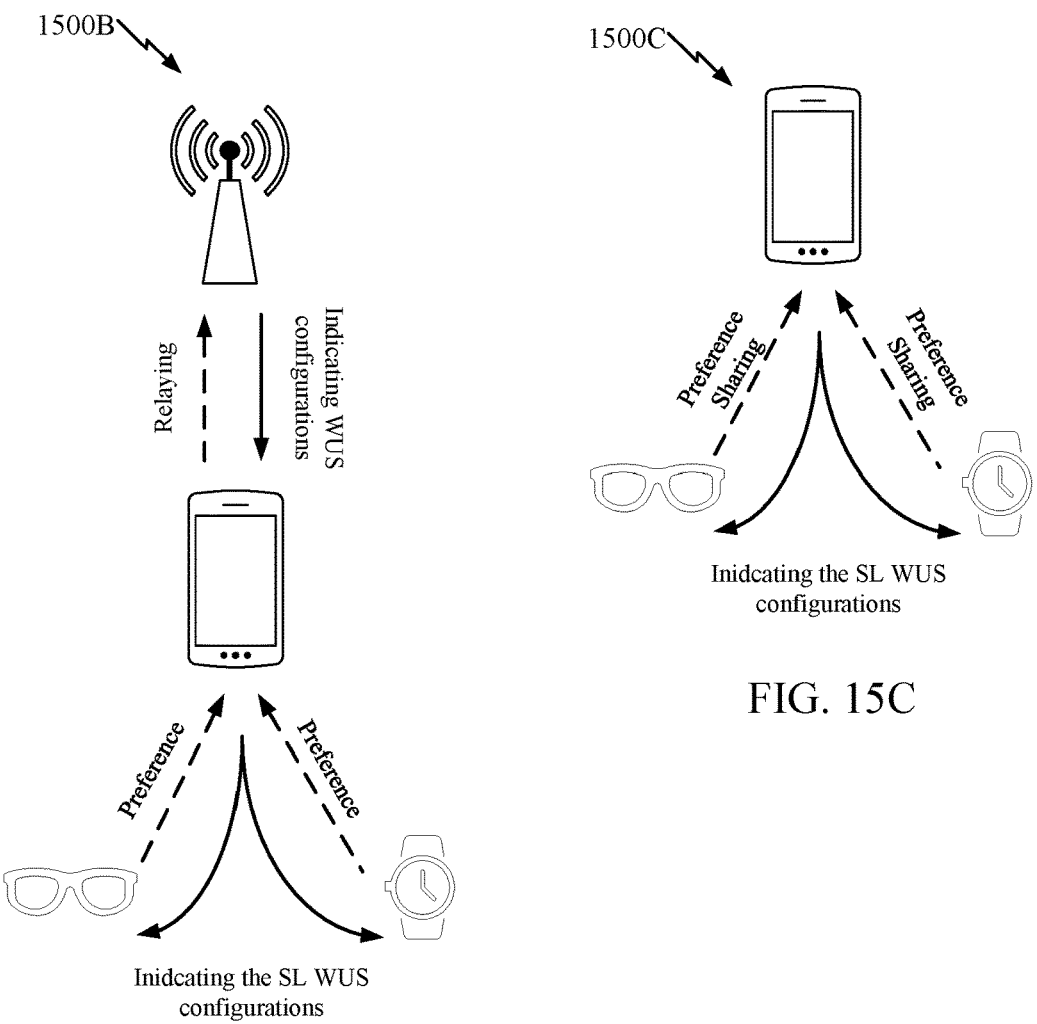
FIG. 15C
FIG. 15B

CONSIDERATIONS FOR SIDELINK (SL) WAKE UP SIGNALS (WUSS)

BACKGROUND

Field of the Disclosure

Aspects of the present disclosure relate to wireless communications, and more particularly, to techniques for sidelink (SL) power saving using SL wake up signals (WUSs).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the long term evolution (LTE) mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include improved sidelink (SL) power consumption.

One or more aspects of the subject matter described in this disclosure can be implemented in a method for wireless communication by a first user equipment (UE). The method generally includes determining resources for sidelink (SL) wake up signal (WUS) transmissions from a second UE, based on a WUS resource configuration; monitoring the resources for an SL WUS from the second UE; and participating in SL communications with the second UE if an SL WUS is detected during the monitoring.

One or more aspects of the subject matter described in this disclosure can be implemented in a method for wireless communication by a second UE. The method generally includes determining resources for SL WUS transmissions to a second UE, based on a WUS resource configuration; transmitting an SL WUS to the second UE on the determined resources; and participating in SL communications with the second UE after transmitting the SL WUS.

One or more aspects of the subject matter described in this disclosure can be implemented in an apparatus for wireless communication by a first UE. The apparatus generally includes at least one processor and a memory coupled to the at least one processor. The memory generally includes code executable by the at least one processor to cause the first UE to determine resources for SL WUS transmissions from a second UE, based on a WUS resource configuration; monitor the resources for an SL WUS from the second UE; and participate in SL communications with the second UE if an SL WUS is detected during the monitoring.

One or more aspects of the subject matter described in this disclosure can be implemented in an apparatus for wireless communication by a second UE. The apparatus generally includes at least one processor and a memory coupled to the at least one processor. The memory generally includes code executable by the at least one processor to cause the second UE to determine resources for SL WUS transmissions to a second UE, based on a WUS resource configuration; transmit an SL WUS to the second UE on the determined resources; and participate in SL communications with the second UE after transmitting the SL WUS.

One or more aspects of the subject matter described in this disclosure can be implemented in an apparatus for wireless communication. The apparatus generally includes means for determining resources for SL WUS transmissions from a second UE, based on a WUS resource configuration; monitoring the resources for an SL WUS from the second UE; and participating in SL communications with the second UE if an SL WUS is detected during the monitoring.

One or more aspects of the subject matter described in this disclosure can be implemented in an apparatus for wireless communication. The apparatus generally includes means for determining resources for SL WUS transmissions to a second UE, based on a WUS resource configuration; means for transmitting an SL WUS to the second UE on the determined resources; and means for participating in SL communications with the second UE after transmitting the SL WUS.

One or more aspects of the subject matter described in this disclosure can be implemented in a computer readable medium storing computer executable code thereon for wireless communication. The computer executable code generally includes code for determining resources for SL WUS transmissions from a second UE, based on a WUS resource configuration; monitoring the resources for an SL WUS from the second UE; and participating in SL communications with the second UE if an SL WUS is detected during the monitoring.

One or more aspects of the subject matter described in this disclosure can be implemented in a computer readable medium storing computer executable code thereon for wireless communication. The computer executable code generally includes code for determining resources for SL WUS transmissions to a second UE, based on a WUS resource configuration; code for transmitting an SL WUS to the second UE on the determined resources; and code for participating in SL communications with the second UE after transmitting the SL WUS.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain aspects of this disclosure and the description may admit to other equally effective aspects.

FIG. 15A illustrates communications between UEs in unicast mode, in accordance with certain aspects of the present disclosure.

FIGS. 15B and 15C illustrate example options for the selection of WUS resources during unicast communication between UEs, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
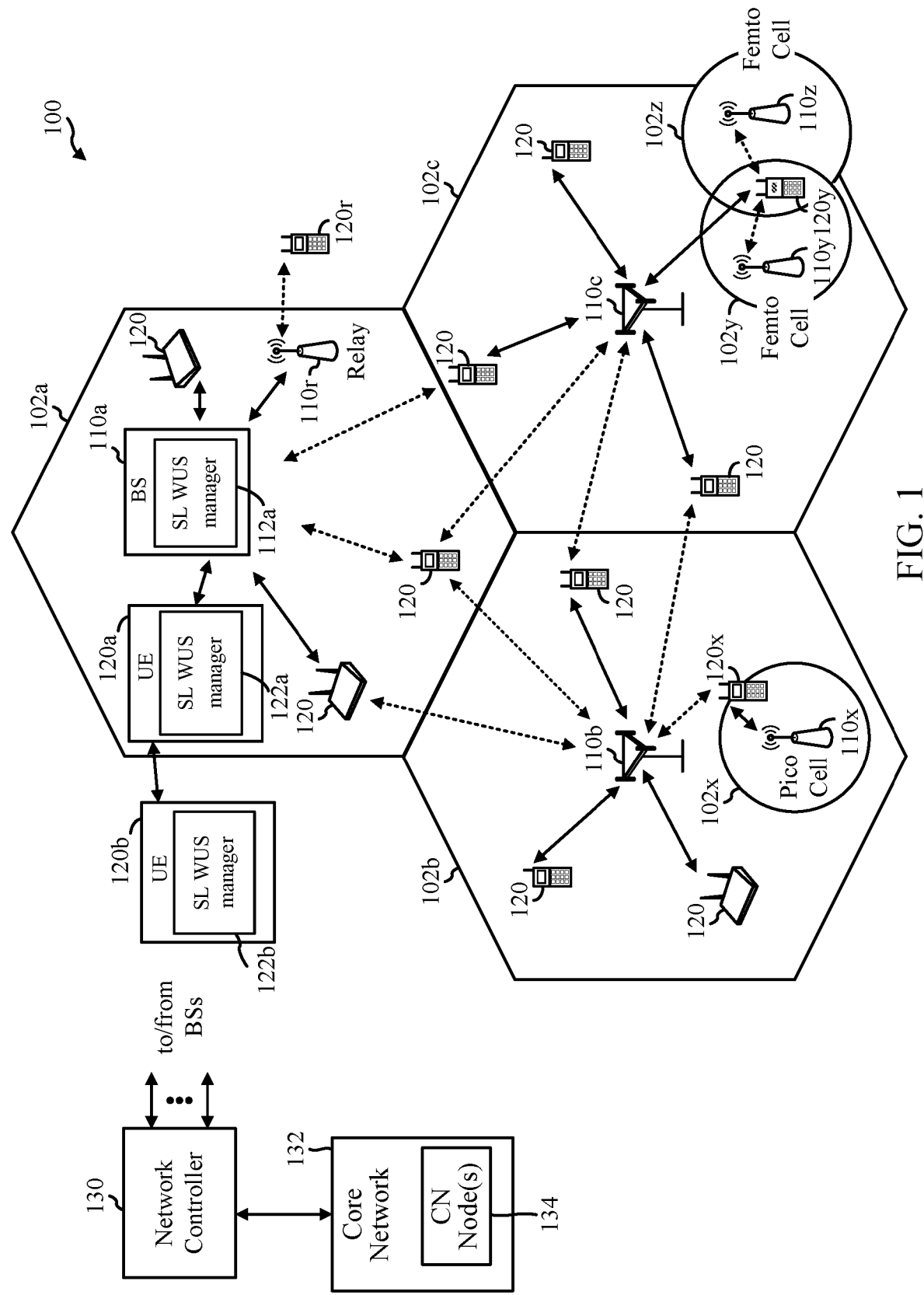
FIG. 1 is a block diagram conceptually illustrating an example telecommunications system, in accordance with certain aspects of the present disclosure.

Aspects of the present disclosure provide apparatus, methods, processing systems, and computer readable mediums for sidelink (SL) power saving using SL wake up signals (WUSs). Use of the SL WUS may allow a device to remaining in a low power state longer and/or return to a low power state sooner.

A wireless device may include baseband processing components, radio frequency (RF) RX front end components (e.g., referred to as a receive (RX) chain), and RF TX front end components (e.g., referred to as a transmit (TX) chain). A power savings configuration may allow the wireless device to power off one or more of these RF components when not in use in order to save power.

In some examples, power saving techniques may be configured for SL communications. The SL power savings configurations may define periods that the wireless node monitors one or more physical sidelink control channels (PSCCH) for transmissions from other remote UEs. In some examples, a power savings configuration may use a SL WUS configuration.

The techniques presented herein allow the wireless node to use SL WUSs for improving power efficiency when a UE is configured with a WUS configuration. In some aspects, SL WUSs may be configured on dedicated (periodic) resources in a WUS resource pool shared by multiple UEs or in a bandwidth part/SL carrier. Actual resources used by UEs to transmit/receive WUSs may only be a subset of the available WUS resources.

The following description provides examples of SL WUS resource configurations. Changes may be made in the function and arrangement of elements discussed without departing from the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies me. For clarity, while aspects may be described herein using terminology commonly associated with 3G, 4G, and/or new radio (e.g., 5G NR) wireless technologies, aspects of the present disclosure can be applied in other generation-based communication systems including later technologies.

NR access may support various wireless communication services, such as enhanced mobile broadband (eMBB) targeting wide bandwidth, millimeter wave (mmW) targeting high carrier frequency, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

NR may also support beamforming and beam direction may be dynamically configured. Multiple-input multiple-output (MIMO) transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, according to certain aspects, the wireless communication network 100 may include UEs 120 configured for SL communications based on SL WUS configurations, as proposed herein. As shown in FIG. 1, the UE 120a includes a SL WUS manager 122a, the UE 120b includes a SL WUS manager 122b, and the BS 110a includes a SL WUS manager 112a. The WUS manager 122a and the WUS manager 122b may be configured to perform operations 800 and 900 of FIGS. 8 and 9.

The wireless communication network 100 may be an NR system (e.g., a 5G NR network). The core network 132 may be in communication with one or more base station (BSs) 110a-z (each also individually referred to herein as BS 110 or collectively as BSs 110) and/or UEs 120a-y (each also individually referred to herein as UE 120 or collectively as UEs 120) in the wireless communication network 100 via one or more interfaces. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. ABS may support one or multiple cells. UEs 120 (e.g., 120x, 120y, etc.) may be dispersed throughout the wireless communication network 100, and each UE 120 may be stationary or mobile.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The network controller 130 may be in communication with the core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
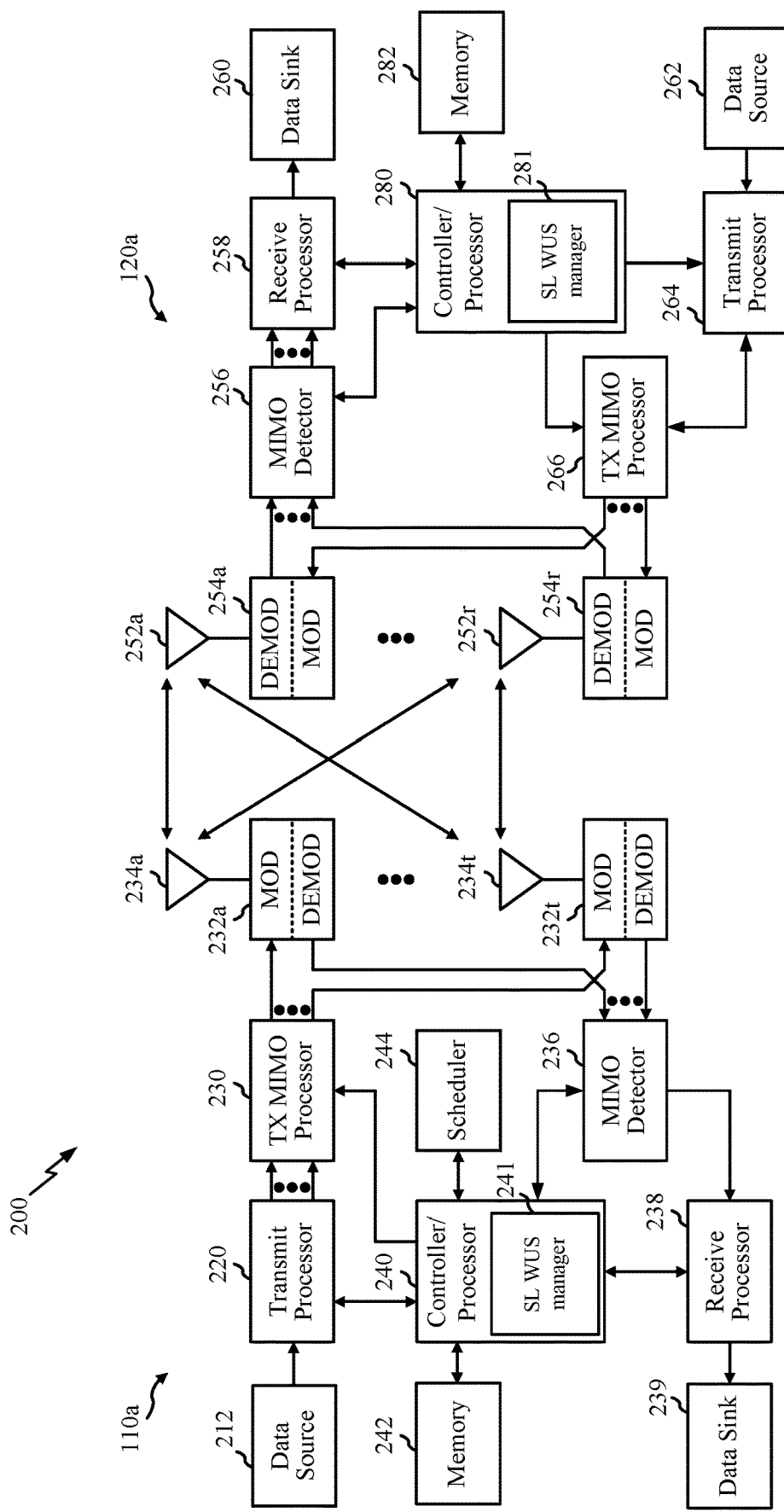
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1, which may be similar components in the UE 120b), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. For example, a BS may transmit a MAC CE to a UE to put the UE into a discontinuous reception (DRX) mode to reduce the UE's power consumption. The MAC-CE may be carried in a shared channel such as a physical downlink shared channel (PDSCH), a physical uplink shared channel (PUSCH), or a physical sidelink shared channel. A MAC-CE may also be used to communicate information that facilitates communication, such as information regarding buffer status and available power headroom.

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator may process a respective output symbol stream (e.g., for OFDM, etc.) to obtain an output sample stream. Each modulator may further process (e.g., convert to analog, amplify, filter, and upconvert) the output sample stream to obtain a downlink (DL) signal. DL signals from modulators in transceivers 232a-232t may be transmitted via the antennas 234a-234t, respectively.

At the UE 120a, the antennas 252a-252r may receive the downlink signals from the BS 110a, or sidelink signals from the UE 120b, and may provide received signals to the demodulators (DEMODs) in transceivers 254a-254r, respectively. Each demodulator may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink (UL) and/or SL, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254 r (e.g., for SC-FDM, etc.), and transmitted to the BS 110a. At the BS 110a, the UL signals from the UE 120a may be received by the antennas 234, processed by the demodulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the DL and/or UL.

Antennas 252, processors 266, 258, 264, and/or controller/processor 280 of the UE 120a and/or antennas 234, processors 220, 230, 238 may be used to perform the various techniques and methods described herein. For example, as shown in FIG. 2, the controller/processor 280 of the UE 120a has a SL WUS manager 281. The SL WUS 281 may be configured for to perform operations 800 and 900 of FIGS. 8 and 9.

Antennas 234, processors 220, 260, 238, and/or controller/processor 240, having a SL WUS manager 241, of the BS 110a may also be used to perform various techniques and methods described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
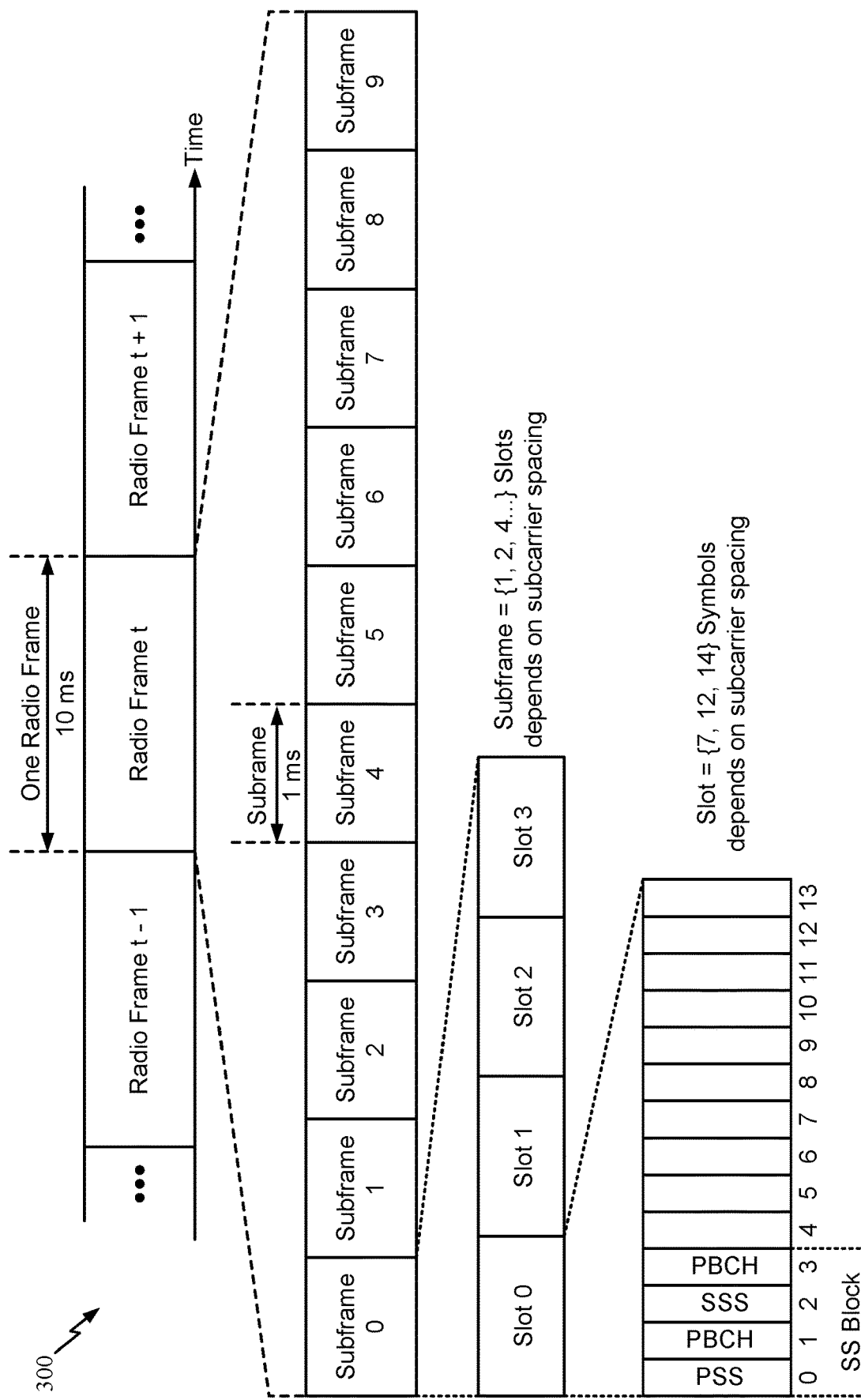
FIG. 3 is an example frame format for new radio (NR), in accordance with certain aspects of the present disclosure.

FIG. 3 is a diagram showing an example of a frame format 300 for NR. The transmission timeline for each of the DL and UL may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

In some examples, access to the air interface may be scheduled. A scheduling entity (e.g., a BS 110) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs 110 are not the only entities that may function as a scheduling entity. In some examples, a UE 120 may function as a scheduling entity and may schedule resources for one or more subordinate entities (e.g., one or more other UEs 120), and the other UEs 120 may utilize the resources scheduled by the UE 120 for wireless communication. In some examples, a UE 120 may function as a scheduling entity in a peer-to-peer (P2P) network, and/or in a mesh network. In a mesh network example, UEs 120 may communicate directly with one another in addition to communicating with a scheduling entity.

In some examples, the communication between the UEs 120 and BSs 110 is referred to as the access link. The access link may be provided via a Uu interface. Communication between devices may be referred as the sidelink.

In some examples, two or more subordinate entities (e.g., UEs 120) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE 120a) to another subordinate entity (e.g., another UE 120) without relaying that communication through the scheduling entity (e.g., UE 120 or BS 110), even though the scheduling entity may be utilized for scheduling and/or control purposes. In some examples, the sidelink signals may be communicated using a licensed spectrum (unlike wireless local area networks, which may use an unlicensed spectrum). One example of sidelink communication is PC5, for example, as used in V2V, LTE, and/or NR.

Various SL channels may be used for SL communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions. The PSFCH may carry feedback such as CSI related to a SL channel quality.

Roadside units (RSUs) may be utilized. An RSU may be used for V2I communications. In some examples, an RSU may act as a forwarding node to extend coverage for a UE. In some examples, an RSU may be co-located with a BS or may be standalone. RSUs can have different classifications. For example, RSUs can be classified into UE-type RSUs and Micro NodeB-type RSUs. Micro NB-type RSUs have similar functionality as the Macro eNB/gNB. The Micro NB-type RSUs can utilize the Uu interface. UE-type RSUs can be used for meeting tight quality-of-service (QoS) requirements by minimizing collisions and improving reliability. UE-type RSUs may use centralized resource allocation mechanisms to allow for efficient resource utilization. Critical information (e.g., such as traffic conditions, weather conditions, congestion statistics, sensor data, etc.) can be broadcast to UEs in the coverage area. Relays can re-broadcasts critical information received from some UEs. UE-type RSUs may be a reliable synchronization source.

Figure 4A:
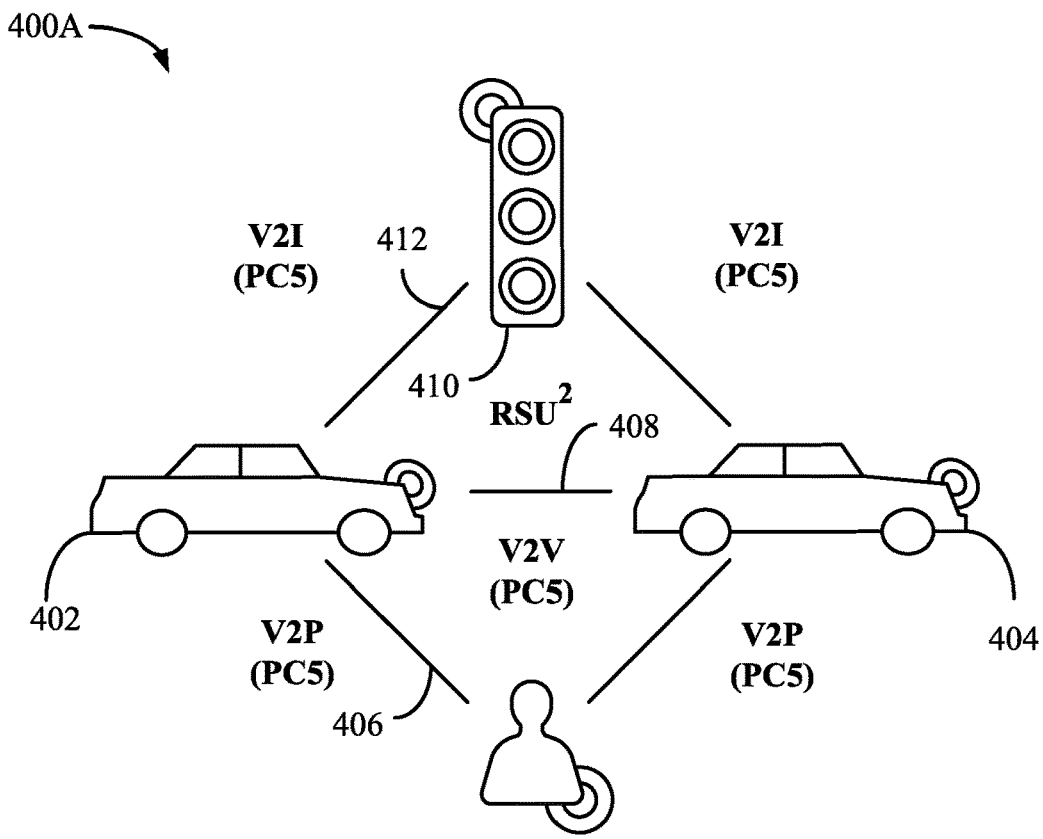
FIGS. 4A and 4B show diagrammatic representations of example vehicle to everything (V2X) systems, in accordance with certain aspects of the present disclosure.
Figure 4B:
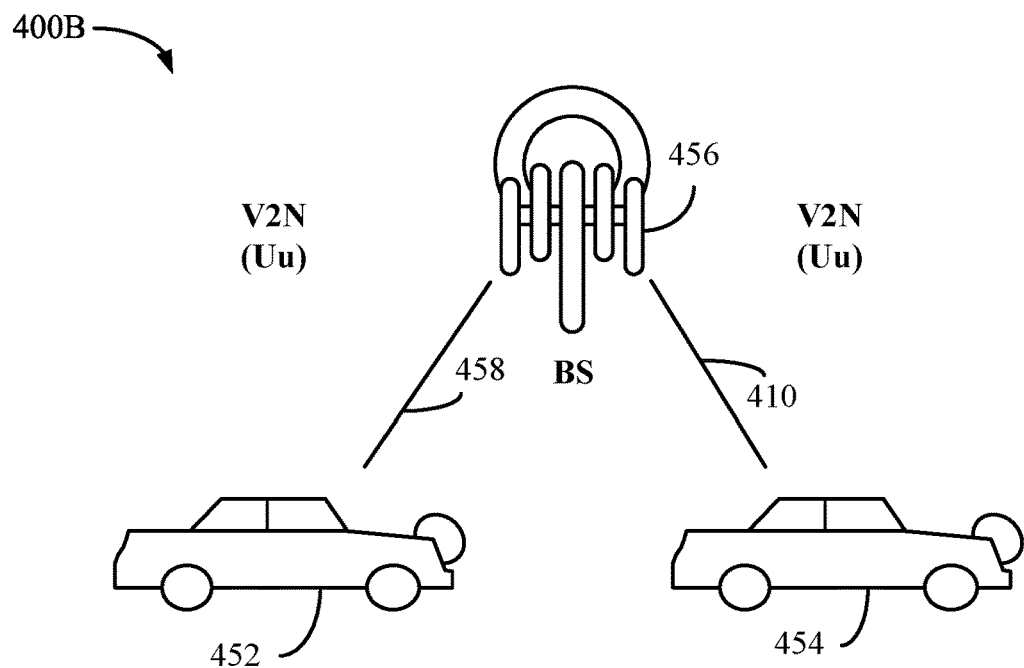

FIGS. 4A and 4B show diagrammatic representations of example vehicle to everything (V2X) systems, in accordance with some aspects of the present disclosure. For example, the vehicles shown in FIGS. 4A and 4B may communicate via SL channels in accordance with a SL WUS resource configuration, as described herein.

The V2X systems, provided in FIGS. 4A and 4B provide two complementary transmission modes. A first transmission mode, shown by way of example in FIG. 4A, involves direct communications (for example, also referred to as SL communications) between participants in proximity to one another in a local area. A second transmission mode, shown by way of example in FIG. 4B, involves network communications through a network, which may be implemented over a Uu interface (for example, a wireless communication interface between a radio access network (RAN) and a UE).

Referring to FIG. 4A, a V2X system 400A (for example, including vV2V communications) is illustrated with two vehicles 402, 404. The first transmission mode may allow for direct communication between different participants in a given geographic location. As illustrated, a vehicle may have a wireless communication link 406 with an individual (vehicle-to-pedestrian (V2P)) (for example, via a UE) through a PC5 interface. Communications between the vehicles 402 and 404 may also occur through a PC5 interface 408. In a like manner, communication may occur from a vehicle 402 to other highway components (for example, highway component 410), such as a traffic signal or sign (vehicle-to-infrastructure (V2I)) through a PC5 interface 412. With respect to each communication link illustrated in FIG. 4A, two-way communication may take place between elements, therefore each element may be a transmitter and a receiver of information. The V2X system 400 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 4B shows a V2X system 450 for communication between a vehicle 452 and a vehicle 454 through a network entity 456. These network communications may occur through discrete nodes, such as a BS (for example, an eNB or gNB), that sends and receives information to and from (for example, relays information between) vehicles 452, 454. The network communications through vehicle to network (V2N) links 458 and 410 may be used, for example, for long range communications between vehicles, such as for communicating the presence of a car accident a distance ahead along a road or highway. Other types of communications may be sent by the node to vehicles, such as traffic flow conditions, road hazard warnings, environmental/weather reports, and service station availability, among other examples. Such data may be obtained from cloud-based sharing services.

As described above, V2V and V2X communications are examples of communications that may be transmitted via a SL. Other applications of SL communications may include public safety or service announcement communications, communications for proximity services, communications for UE-to-network relaying, device-to-device (D2D) communications, Internet of Everything (IoE) communications, Internet of Things (IoT) communications, mission-critical mesh communications, among other suitable applications. Generally, a SL may refer to a direct link between one subordinate entity (for example, UE1) and another subordinate entity (for example, UE2).

Various SL channels may be used for SL communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as SL resource configurations and other parameters used for data transmissions, and the PSSCH may carry the data transmissions.

For the operation regarding PSSCH, a UE may perform either transmission or reception in a slot on a carrier. NR SL may support, for a UE, a case where all the symbols in a slot may be available for SL, as well as another case where only a subset of consecutive symbols in a slot may be available for SL.

PSFCH may carry feedback such as CSI related to a SL channel quality. A sequence-based PSFCH format with one symbol (not including automatic gain control (AGC) training period) may be supported. The following formats may be possible: a PSFCH format based on PUCCH format 2 and a PSFCH format spanning all available symbols for SL in a slot.

Figure 5A:
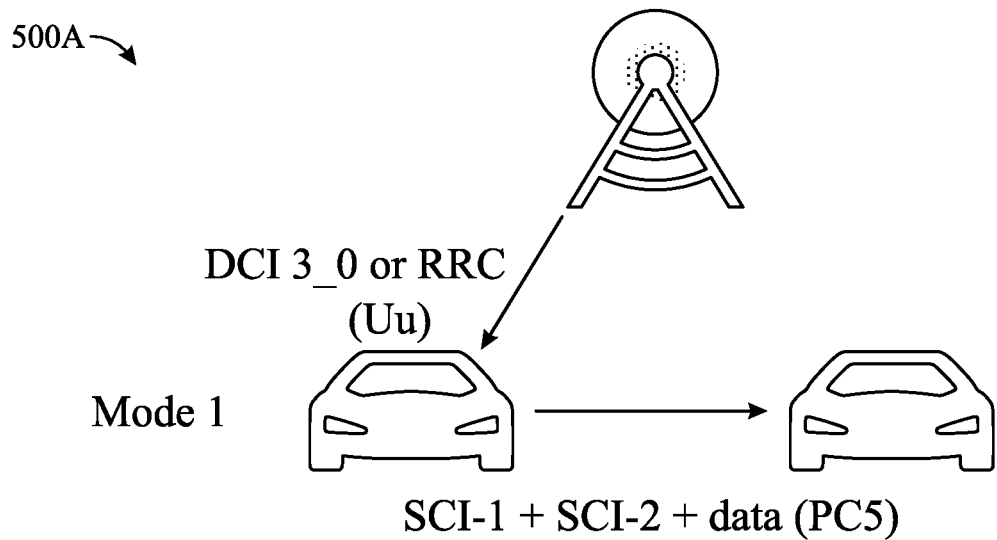
FIGS. 5A and 5B illustrate two modes of sidelink (SL) communications, in accordance with certain aspects of the present disclosure.
Figure 5B:
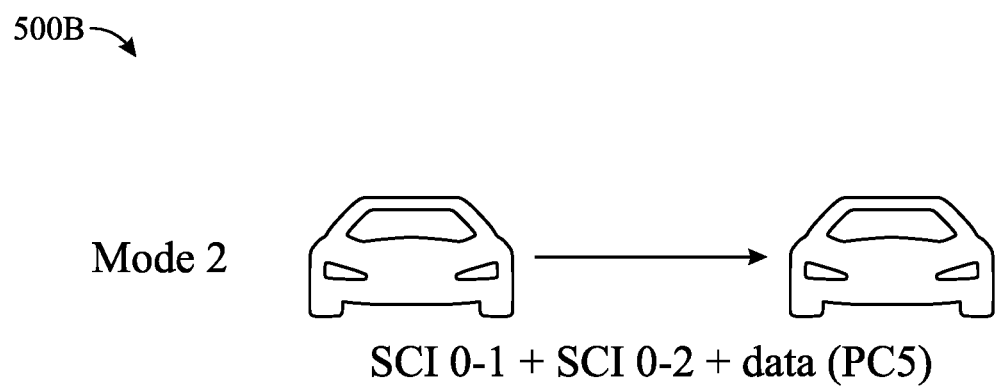

In NR, there are generally two basic SL resource allocation modes. FIGS. 5A and 5B illustrate two modes of SL communication, in accordance with certain aspects of the present disclosure. RX UE behavior may be the same for both SL resource allocation modes.

According to a first mode, Mode 1 (e.g., centralized mode), as shown in FIG. 5A, a BS may allocate SL resources for SL communication between UEs. For example, a BS may transmit downlink control information (e.g., DCI 3_0) to allocate time and frequency resources and indicate transmission timing. A modulation and coding scheme (MCS) may be determined by a UE within the limit set by the BS.

In some cases, Mode 1 may support dynamic grants (DGs) and configured grants (CGs) (e.g., CG Type 1 and CG Type 2). CG Type 1 may be activated via radio resource control (RRC) signaling from the BS.

According to a second mode, Mode 2 (e.g., distributed mode), as shown in FIG. 5B, UEs may determine the SL resources (the BS does not schedule SL transmission resources within SL resources configured by BS/network). In this case, UEs may autonomously select SL resources for transmission (following some rules in the NR standard). A UE may assist in SL resource selection for other UEs. A UE may be configured with an NR configured grant for SL transmission, and the UE may schedule SL transmissions for other UEs.

In some cases, a V2X UE may perform channel sensing by blindly decoding all PSCCH channels to determine which resources are reserved for other SL transmissions, by other UEs. In this case, the V2X UE may be required to perform sensing and reception at all times, which may be very power consuming. However, it may be desirable to only monitor during certain time-frequency resources of the channel for the messages in order to reduce power consumption at the UE.

Power savings configurations may be configured for the sidelink(s) to allow a wireless device to power off one or more RF components when not in use in order to save power. Specifically, 3GPP Release 17 systems focus on power saving techniques in non-vehicular applications, such as, public safety application, commercial use cases, wearables, etc. Such systems seek to achieve maximum power savings in the physical/medium access control layer (MAC) layer. In some examples, a power savings configuration may use partial sensing. In some examples, a power savings configuration may use discontinuous reception (DRX) cycles.

Figure 6:
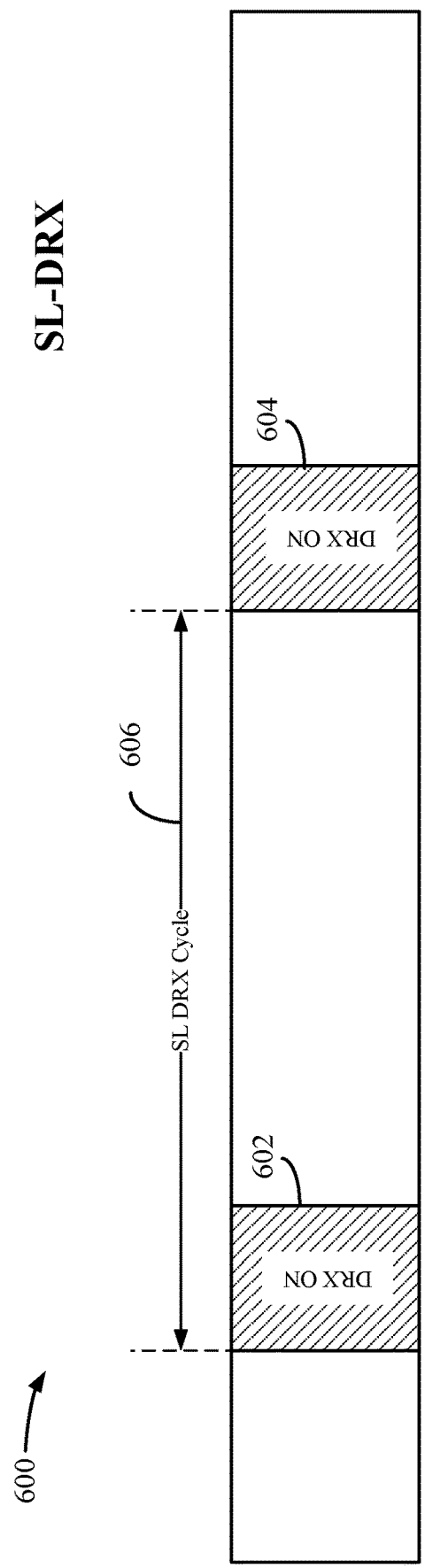
FIG. 6 is a diagram illustrating an example discontinuous reception (DRX) cycle, in accordance with certain aspects of the present disclosure.

FIG. 6 illustrates an example SL DRX configuration 600 of a UE. As illustrated, the SL DRX configuration 600 may include SL DRX ON (e.g., awake phase) durations 602, 604 (also referred to as a DRX ON phase). As described herein, an SL DRX ON phase may repeat every DRX cycle. For example, the DRX ON duration 602 may be during a DRX cycle 406, as illustrated. A TX UE may be awake during the DRX ON durations 602, 604 to communicate with another RX UE for unicast or RX UEs for broadcast and groupcast, (e.g., RX UE(s) monitors for signaling that may be received from the TX UE), and both TX UE and RX UE(s) are in a low power state (e.g., sleep phase) at other times (also referred to as SL DRX OFF durations or SL DRX OFF phases). In addition, a UE of a service, a group, or a UE pair, may become a TX UE on SL when it has a packet to transmit on SL to the other UEs of a service or a group or to the other UE of a UE pair. Hence, differently from the DRX for a UE monitoring downlink control information (DCI) from a network entity at the Uu interface, SL DRX may be bidirectional on SL for both TX UE and RX UE(s) and; therefore, an SL DRX may form SL traffic patterns for a service, a group or a UE pair.

To further reduce the UE's workload for reception, by avoiding waking up or keeping a UE awake unnecessarily, a UE may be configured with a SL WUS configuration. Accordingly, aspects of the present disclosure provide SL WUS configurations used to improve power efficiency in SL communications.

Example Design Considerations for Sidelink (SL) Wake Up Signals (WUSs)

Techniques described herein may use a sidelink (SL) wake up signal (WUS) to indicate to a wireless node, such as a user equipment (UE) participating in SL communications, whether an upcoming control channel signal resource includes information relevant to the UE. The SL WUS may be designed to allow for detection by a UE with relatively simple, low power, processing. In this way, the UE may more fully wake up to perform complex control channel signal processing only when the control channel includes signals relevant to the UE, thereby conserving battery power and resources of the UE.

Figure 7:
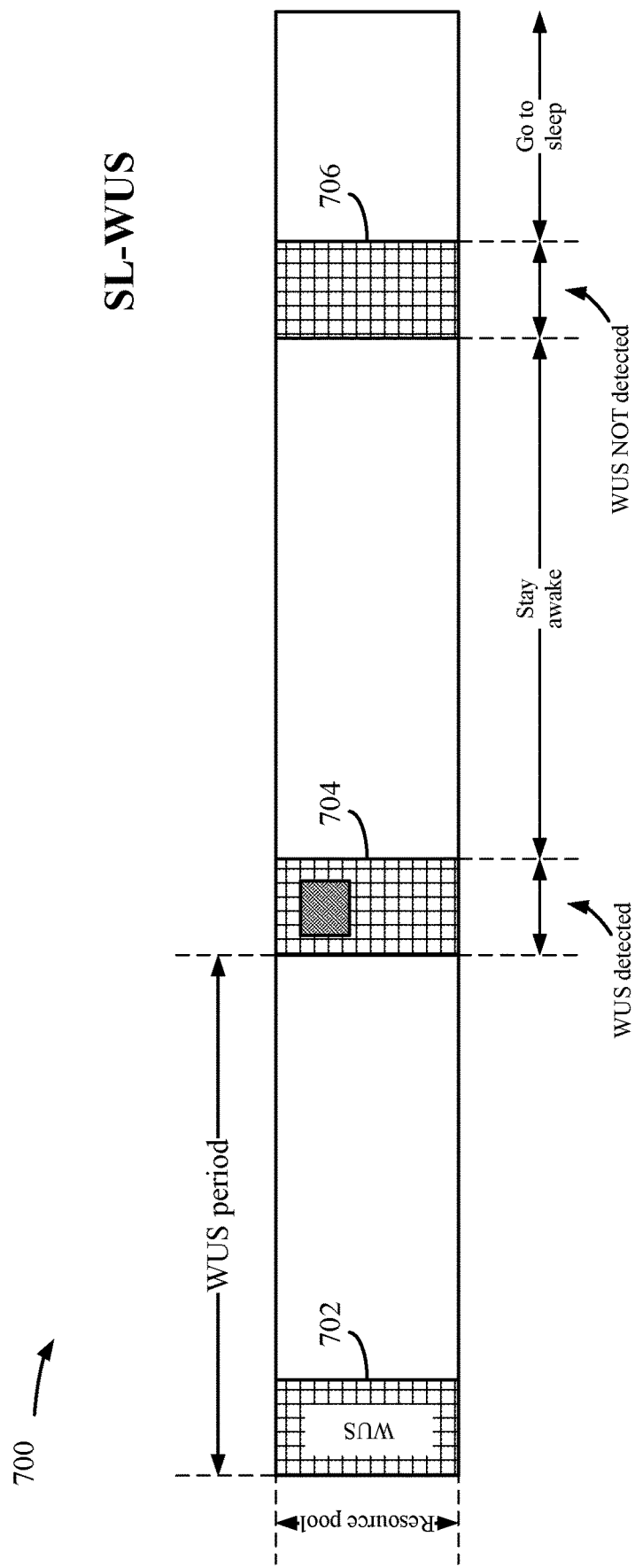
FIG. 7 is a diagram illustrating an example sidelink (SL) wake up signal (WUS) configuration, in accordance with certain aspects of the present disclosure.

FIG. 7 is a diagram illustrating a timeline 700 for an example SL WUS configuration, in accordance with certain aspects of the present disclosure. As illustrated, the SL WUS configuration may include WUS monitoring occasions 702, 704, 706. As described herein, a WUS monitoring occasion may repeat every WUS period. In some examples, a UE may only wake up a low power WUS receiver to monitor in (one or a subset of) WUS monitoring occasions 702, 704, 706.

If a UE does not detect a WUS in the WUS monitoring occasion, as illustrated in WUS monitoring occasion 702, then the UE may remain in a low power (sleep) state with various RF components powered down. If a UE detects a WUS in the WUS monitoring occasion, as illustrated in WUS monitoring occasion 704, then the UE may stay awake and communicate with another receiver (RX) UE for unicast or RX UEs for broadcast and groupcast. The UE may stay awake for the WUS period, determine whether a WUS is detected in a subsequent monitoring occasion, such as WUS monitoring occasion 706, and decide to return to a sleep phase if a WUS is not detected following a prior WUS monitoring occasion where the WUS was detected.

Figure 8:
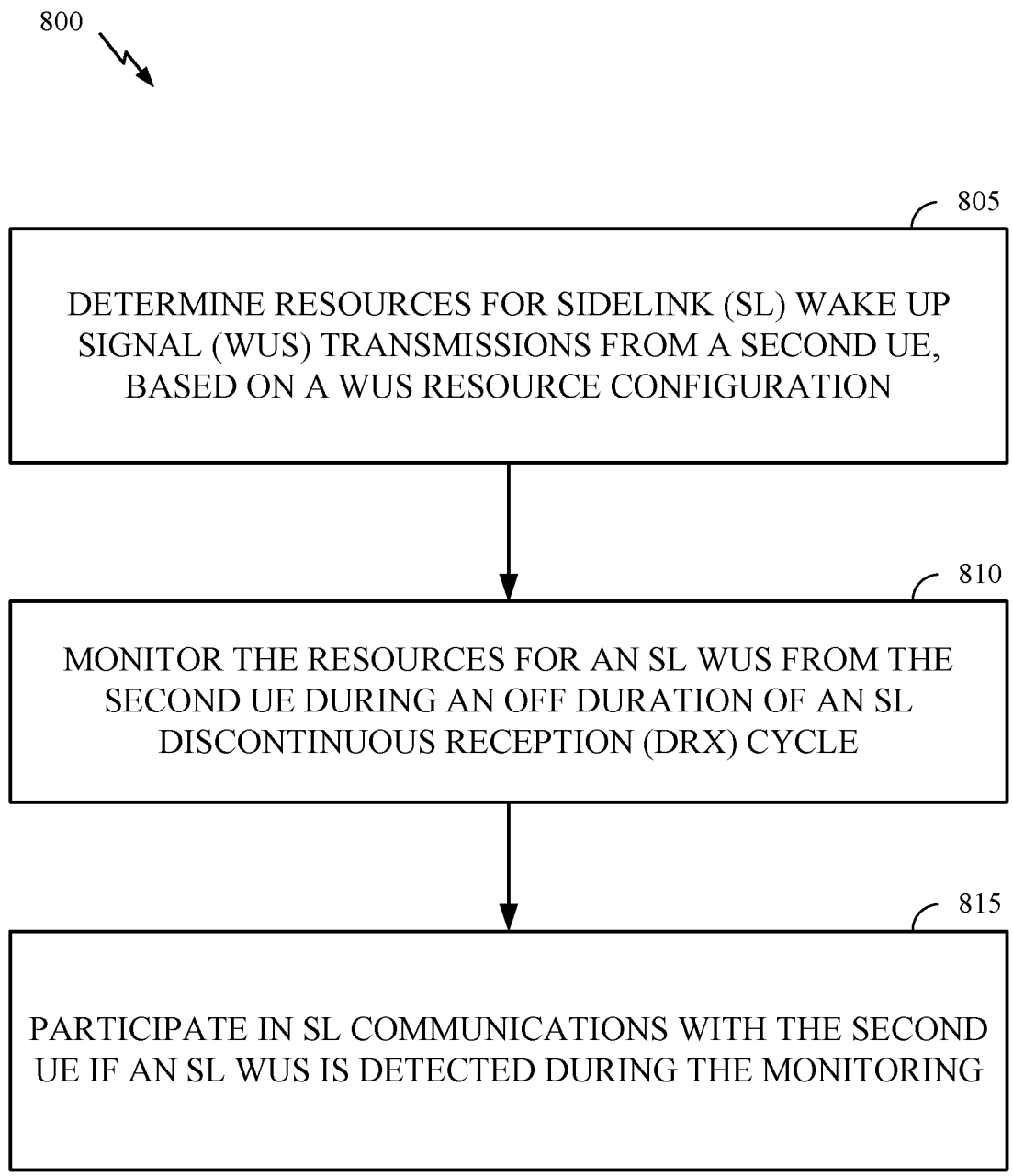
FIG. 8 is a flow diagram illustrating example operations for wireless communication by a UE, in accordance with aspects of the present disclosure.

FIG. 8 is a flow diagram illustrating example operations 800 for wireless communication by a first UE, in accordance with certain aspects of the present disclosure. The operations 800 may be performed, for example, by a wireless node (e.g., such as a UE 120a in the wireless communication network 100). Operations 800 may be implemented as software components that are executed and run on one or more processors (e.g., controller/processor 280 of FIG. 2). Further, the transmission and reception of signals by the wireless node in operations 800 may be enabled, for example, by one or more antennas (e.g., antennas 252 of FIG. 2). In certain aspects, the transmission and/or reception of signals by the wireless node may be implemented via a bus interface of one or more processors (e.g., controller/processor 280) obtaining and/or outputting signals.

The operations 800 may begin, at block 805, by determining resources for SL WUS transmissions from a second UE, based on a WUS resource configuration.

At block 810, the first UE monitors the resources for an SL WUS from the second UE.

At block 815, the first UE participates in SL communications with the second UE if an SL WUS is detected during the monitoring.

Figure 9:
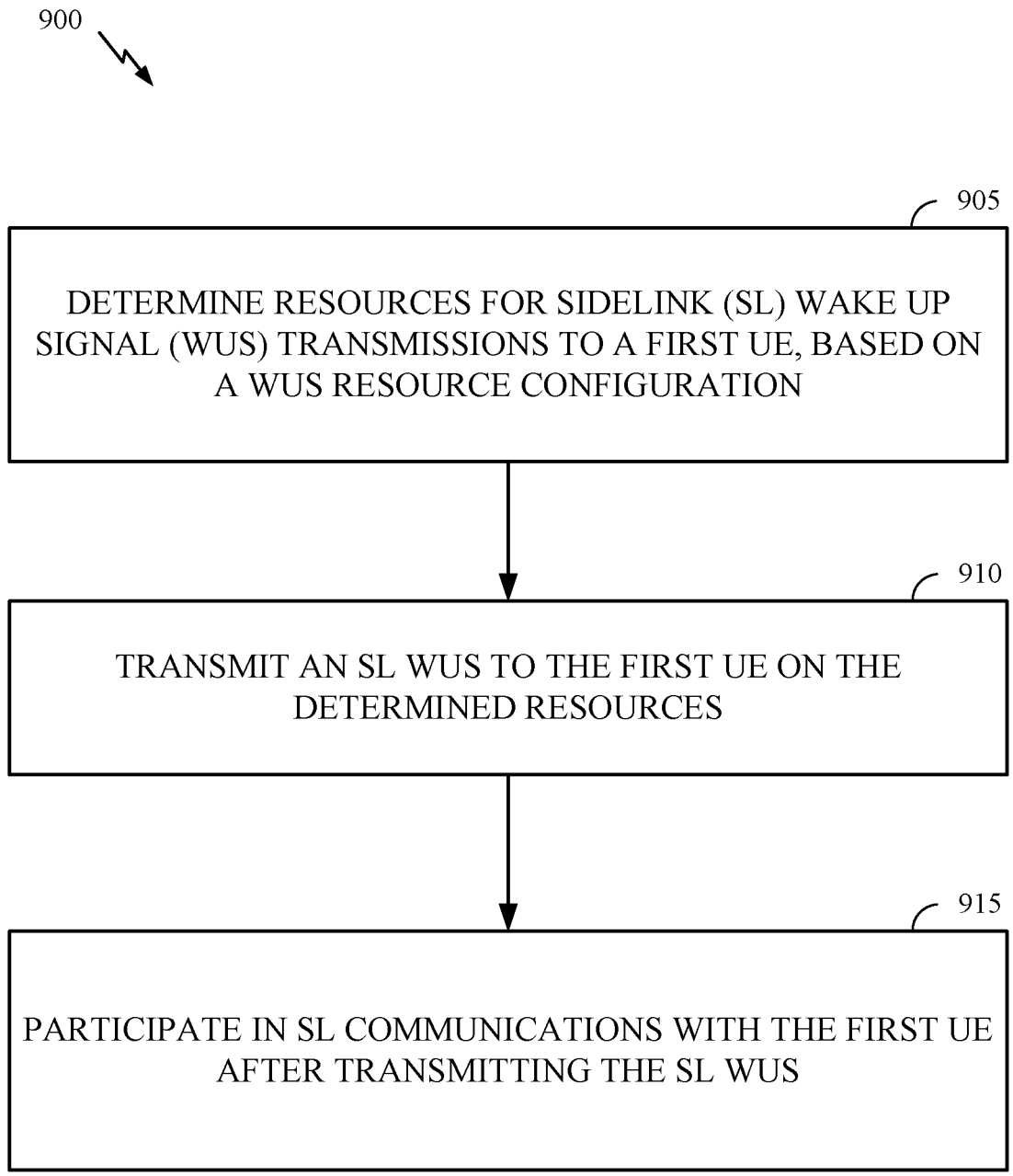
FIG. 9 is a flow diagram illustrating example operations for wireless communication by a UE, in accordance with aspects of the present disclosure.

FIG. 9 is a flow diagram illustrating example operations 900 that may be considered complementary to operations 800 of FIG. 8. For example, operations 900 may be performed by a second UE to transmit a SL WUS to (and perform SL communications with) a first UE performing operations 800 of FIG. 8. The operations 900 may be performed, for example, by a remote UE (e.g., such as a UE 120a in the wireless communication network 100). Operations 900 may be implemented as software components that are executed and run on one or more processors (e.g., controller/processor 280 of FIG. 2). Further, the transmission and reception of signals by the remote UE in operations 900 may be enabled, for example, by one or more antennas (e.g., antennas 252 of FIG. 2). In certain aspects, the transmission and/or reception of signals by the remote UE may be implemented via a bus interface of one or more processors (e.g., controller/processor 280) obtaining and/or outputting signals.

The operations 900 may begin, at block 905, by determining resources for SL WUS transmissions to a first UE, based on a WUS resource configuration.

At block 910, the second UE transmits an SL WUS to the first UE on the determined resources.

At block 915, the second UE participates in SL communications with the first UE after transmitting the SL WUS.

Figure 10A:
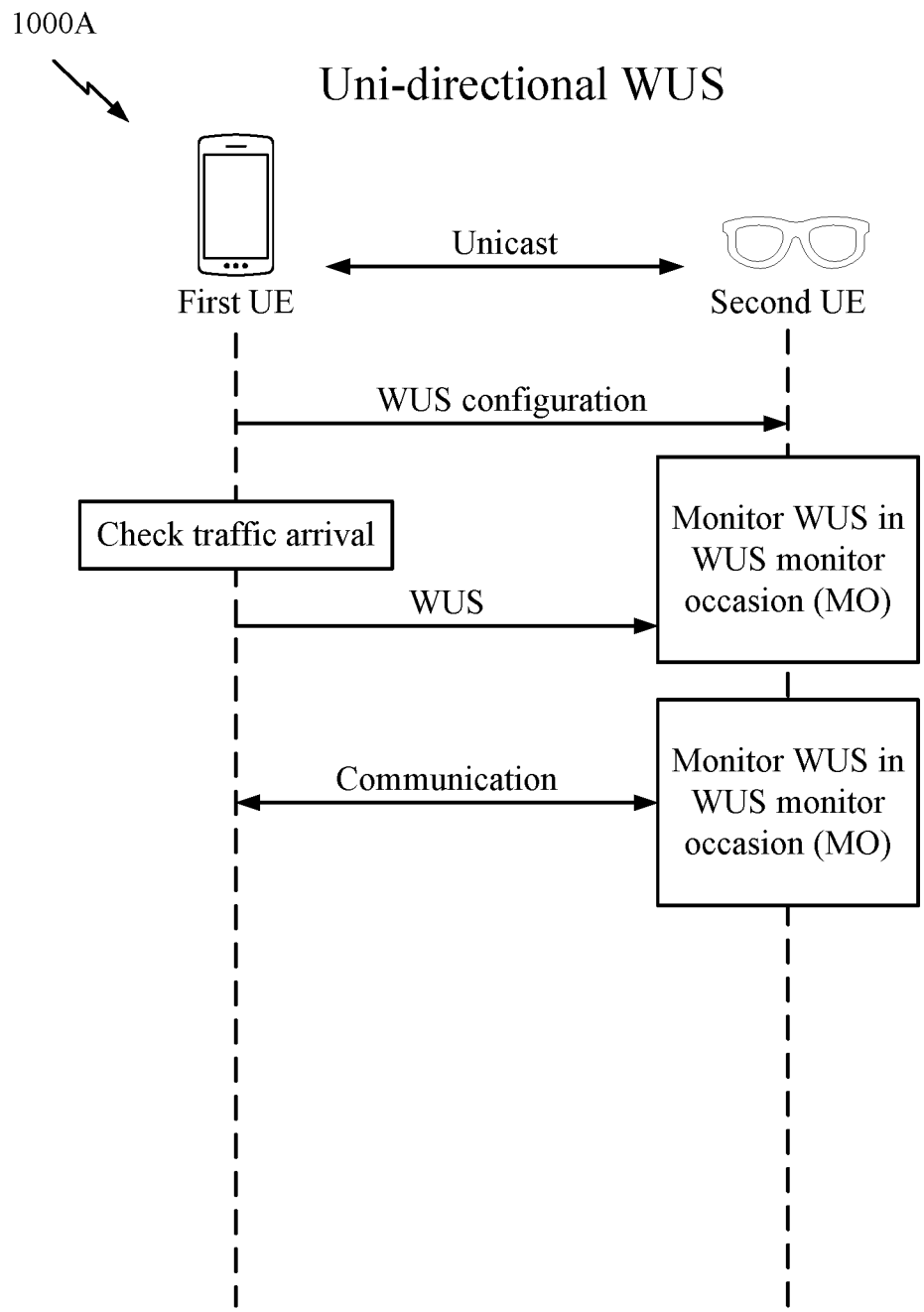
FIGS. 10A and 10B are call flow diagrams illustrating example SL communications between UEs for uni-directional and bi-directional WUS configurations, respectively, in accordance with certain aspects of the present disclosure.
Figure 10B:
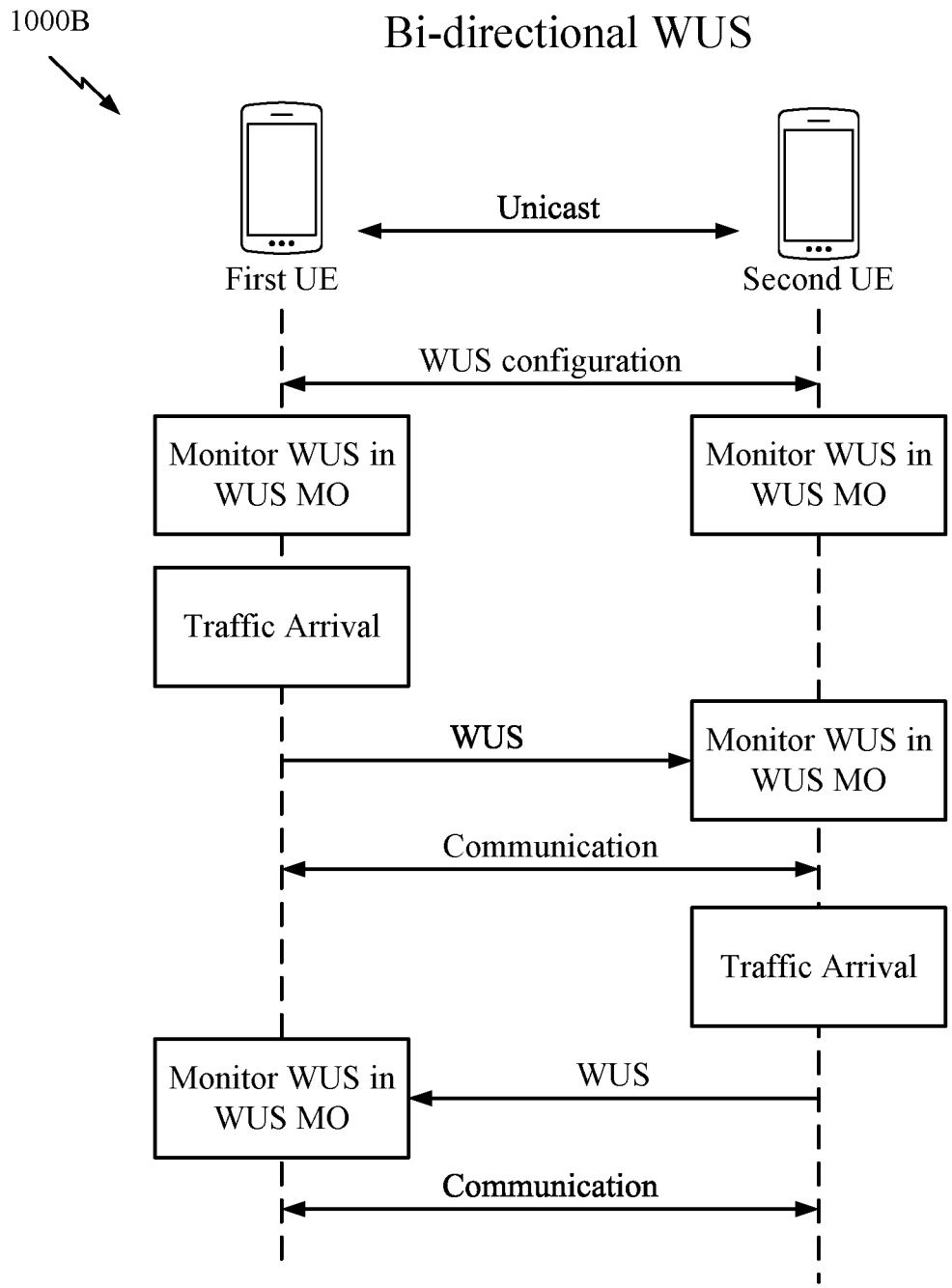

Operations 800 and 900 of FIGS. 8 and 9 may be understood with reference to call flow diagrams 1000A and 1000B of FIGS. 10A and 10B that show example SL communications between UEs for uni-directional and bi-directional WUS configurations, respectively, in accordance with certain aspects of the present disclosure.

As mentioned above, a UE of a service, a group, or a UE pair, may initiate an SL transmission (become a TX UE on SL) when it has a packet to transmit to the other UEs of a service or a group or to the other UE of a UE pair. Hence, differently from a downlink (DL) scenario where a network entity (e.g., a BS) is responsible for determining and transmitting a WUS configuration at the Uu interface, SL WUSs may be uni-directional or bi-directional (either UE of an SL pair may send an SL WUS) for both TX UE and RX UE(s).

As illustrated in FIG. 10A, for a uni-directional WUS scenario, one UE may configure another UE for SL WUS and transmit the SL WUS to another UE (which may be similar to DL WUS configuration where the BS configures and transmits the WUSs). When SL connection is established between two UEs (e.g., during a SL discover procedure), the UEs may negotiate to determine which UE will transmit the SL WUS and which UE will receive the SL WUS. In the uni-directional WUS scenario, the determined WUS RX UE may not transmit a SL WUS, only the WUS TX UE may transmit a SL WUS.

In this case, a first UE (e.g., the SL WUS TX UE) may transmit a SL WUS to a second UE (e.g., the SL WUS RX UE). After receiving the SL WUS, the second UE may transmit to the first UE at any given time (subject to discontinuous reception (DRX) constraint at the WUS TX UE). The second UE may be less capable (e.g., in the sense of battery power) than the first UE. In such cases, the second UE may assume that the first UE is always awake (i.e., SL WUS TX UE is not engaging in power saving), or that the first UE will be awake for some amount of time based on the presence of the SL WUS. Based on this assumption, the second UE will not need to send a WUS to the first UE (which is why this scenario may be referred to as a uni-directional WUS scenario).

As illustrated in FIG. 10B, the configuration and transmission of WUS configurations may be bi-directional, wherein both UEs may transmit their own SL WUS.

According to one option, a wake up state may only be defined for one direction. For example, if traffic arrives at a first UE (e.g., SL WUS TX UE), the first UE may transmit a SL WUS to a second UE (e.g., SL WUS RX UE). The second UE may monitor for the SL WUS in a WUS monitoring occasion. When the WUS is detected, the second UE may only receive transmissions from the first UE. Because the wake up state is only defined for a single direction, the second UE may not transmit SL transmissions to the first UE, with the exception of transmitting SL hybrid automatic repeat request (HARQ) acknowledgement (ACK)

feedback. For the second UE to transmit data back to the first UE, the second UE may need to transmit a SL WUS to the first UE.

According to another option, a wake up state may be defined for both directions. For example, if traffic arrives at a first UE (e.g., SL WUS TX UE), the first UE may transmit a SL WUS to a second UE (e.g., SL WUS RX UE), similar to the example where a wake up state is defined for one direction. However, when a wake up state is defined for both directions, the transmitted SL WUS may serve to wake up both the first and second UE (e.g., wake up both the SL WUS TX UE and the SL WUS RX UE). Therefore, the SL WUS may serve to wake up both transmitter and receiver components at the first UE (and similarly, both the transmitter and receiver components of the second UE), thereby allowing the second UE to transmit and receive from the first UE and the first UE to transmit and receive from the second UE.

Figure 11:
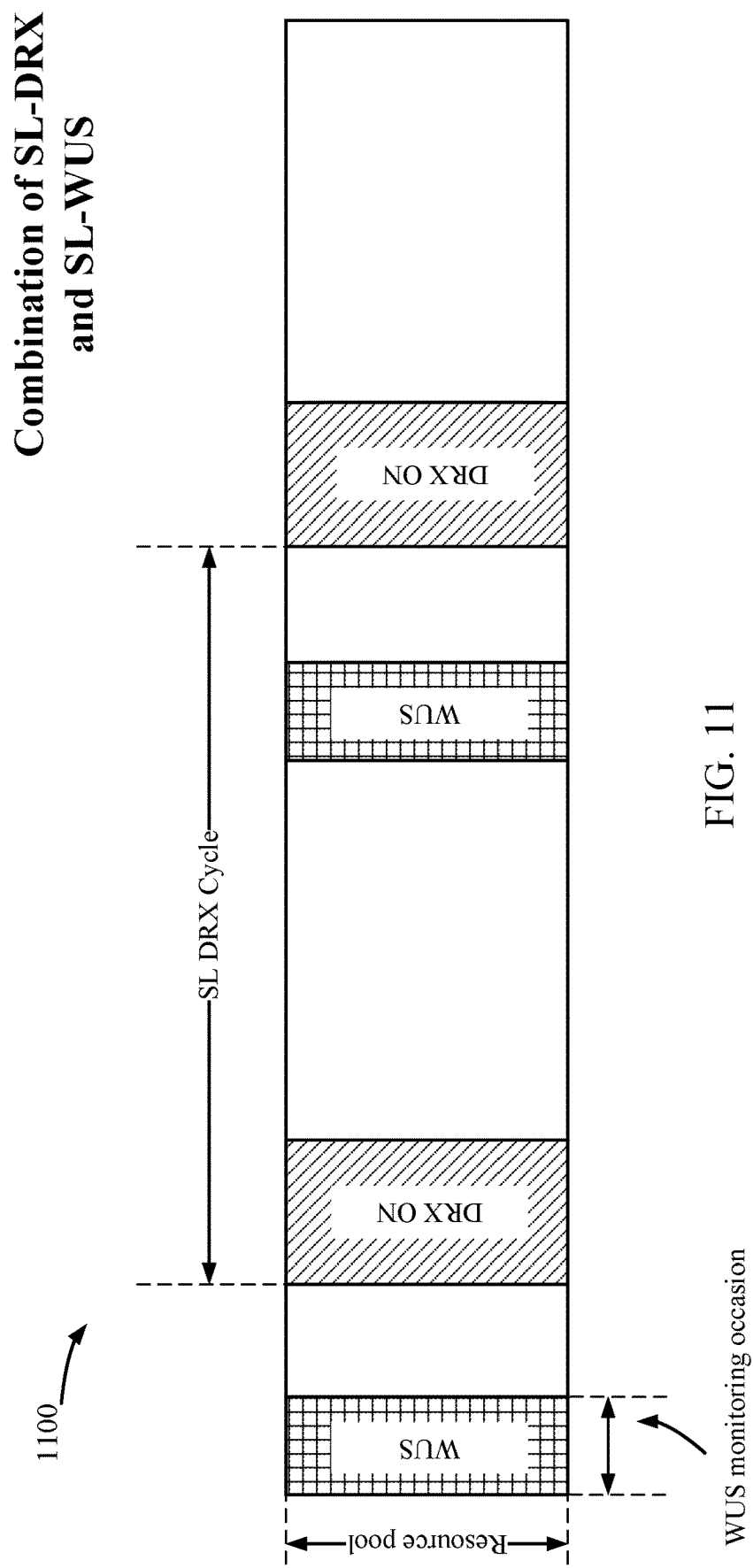
FIG. 11 is a diagram illustrating an example SL WUS configuration in combination with a DRX cycle, in accordance with certain aspects of the present disclosure.

According to certain aspects, a WUS resource configuration may be configured jointly with a SL DRX configuration. FIG. 11 is a diagram 1100 illustrating an example SL WUS configuration in combination with a DRX cycle, in accordance with certain aspects of the present disclosure. Combining SL DRX and SL WUS may reduce a remote UE's workload for reception, avoiding waking up or staying awake unnecessarily.

In other words, jointly configuring a WUS resource configuration with a SL DRX configuration may add an extra layer of power saving before each SL DRX ON duration. As mentioned above, SL DRX ON durations (and SL DRX OFF durations) may repeat every SL DRX cycle. When a WUS configuration is jointly configured with a SL DRX configuration, the WUS resource configuration may indicate one or more WUS monitoring occasions within a slot for the first UE to monitor.

The WUS monitoring occasions may occur (periodically) during a SL DRX OFF duration of the SL DRX configuration (also prior to each SL DRX ON duration). If a SL WUS is detected during the monitoring in the WUS monitoring occasion, the UE may wake up and enter a DRX ON state. If a SL WUS is not detected during the monitoring in the WUS monitoring occasion, the UE may not enter a DRX ON state and may remain in a low power state during the SL DRX ON duration of the SL DRX configuration (i.e., remain in a low power state until the next WUS monitoring occasion). Accordingly, the joint configuration may allow a UE to avoid waking up and/or staying awake unnecessarily, thereby further reducing the remote UE's workload for reception.

Figure 12A:
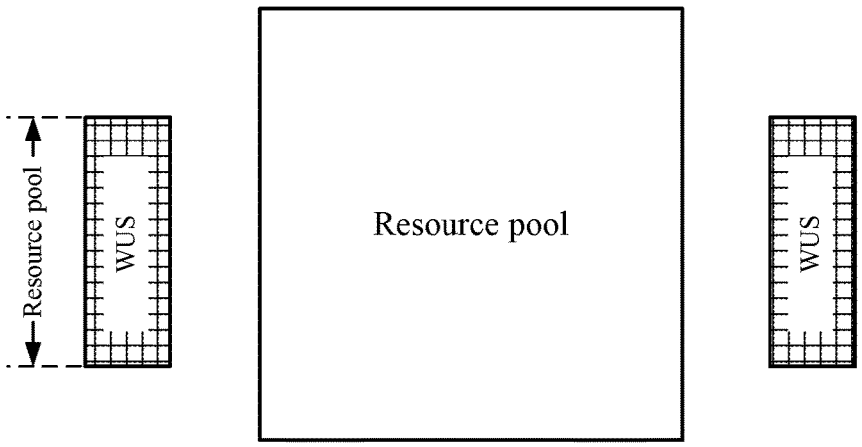
FIGS. 12A and 12B illustrate example options for WUS resource configurations, in accordance with certain aspects of the present disclosure.
Figure 12B:
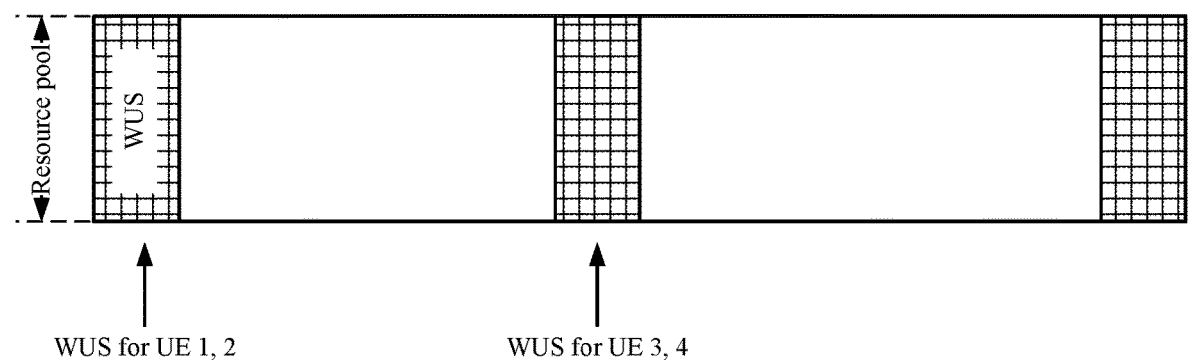

SL WUSs may be configured and transmitted on dedicated (periodic) resources. FIGS. 12A and 12B illustrate example options for periodic SL WUS resource configurations, in accordance with certain aspects of the present disclosure.

According to a first WUS resource configuration option, the dedicated resources may be decoupled from the resource pool configuration, as shown in FIG. 12A. In other words, SL WUS resources may be configured in a bandwidth part (BWP) or a SL carrier, and may not be contained/configured in any of the resource pools in the BWP or SL carrier. In some aspects, the SL WUS may also be applicable to other BWPs or SL carriers. For example, a SL WUS RX UE may monitor for/receive an SL WUS in one BWP and wake up to receive transmissions from other BWPs.

In some examples, the WUS resources may be configured to be a narrow band, and an SL WUS RX UE may only need to enable RF for the narrow band to receive the SL WUS. In such cases, the SL WUS RX UE may monitor for the SL WUS with a first RF bandwidth setting according to a BWP or SL carrier where the WUS resources are configured, and if a WUS is detected by the SL WUS RX UE, the SL WUS RX UE may enable additional RF components participate in SL communications with the SL WUS TX UE using a second RF bandwidth setting wider than the first RF bandwidth setting (e.g., the SL WUX RX UE may monitor for a SL WUS on a narrower bandwidth setting than a bandwidth setting used to receive a packet, after the SL WUS RX UE has detected a SL WUS).

According to a second WUS resource configuration option, the dedicated resources for SL WUSs may be contained/configured in a WUS resource pool shared by multiple UEs. As shown in FIG. 12B, different WUS monitoring occasions may be allocated to different UEs. For example, each pair of UEs may be allocated an SL WUS occasion every two slots. As a result the monitoring occasions for a pair of UEs may be longer, for example, every thirty slots. Accordingly, a pair of UEs may only wake up on selected WUS monitoring occasions. In the example illustrated in FIG. 12B, a first pair UE 1 and UE 2 is allocated a first WUS monitoring occasion, while a second pair UE 3 and UE 4 is allocated a second WUS monitoring occasion, as shown in FIG. 12B. For this resource configuration option, if a UE is configured (or pre-configured) with WUS functionality (e.g., pre-configured with a WUS resource configuration), then at least one resource pool may be configured with WUS resources.

According to the second WUS resource configuration option, the WUS resource configuration indication may indicate one or more WUS monitoring occasions within a slot for the SL WUS RX UE to monitor.

Figure 13A:
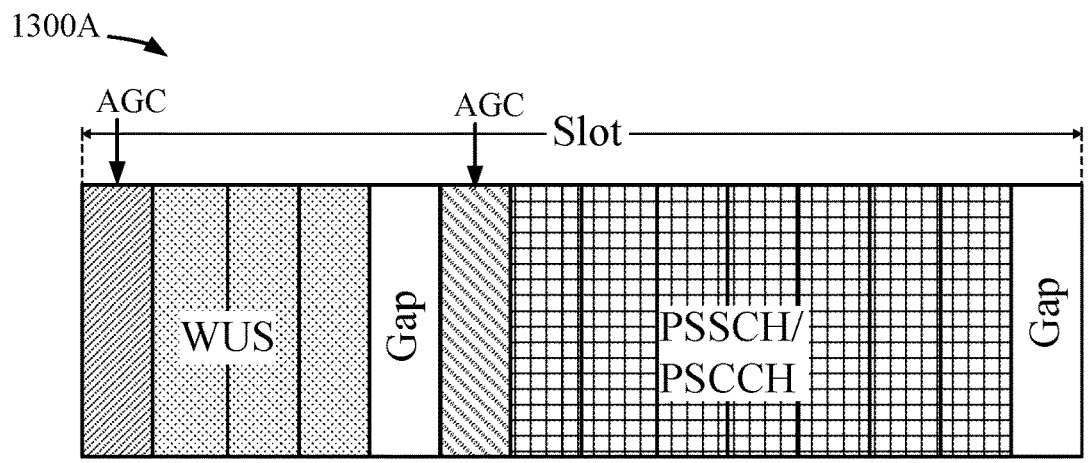
FIGS. 13A-13C illustrate example slot formats when WUS resources are contained in a WUS resource pool shared by multiple UEs, in accordance with certain aspects of the present disclosure.
Figure 13B:
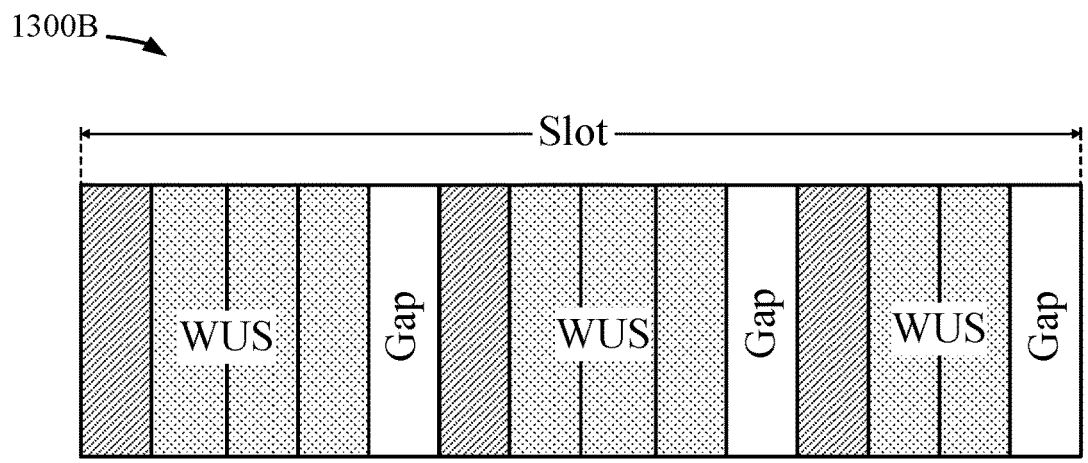
Figure 13C:
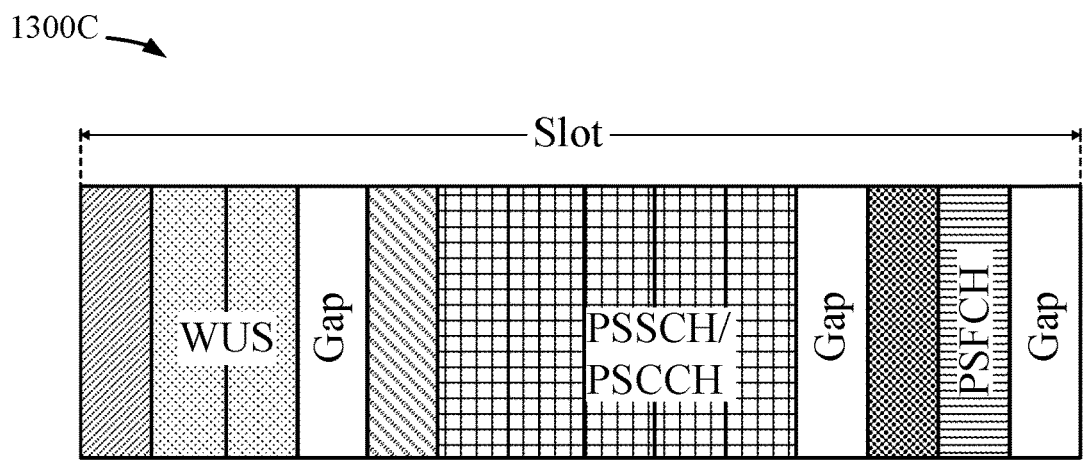

FIGS. 13A-13C illustrate example slot formats when WUS resources are contained in a WUS resource pool shared by multiple UEs, in accordance with certain aspects of the present disclosure. As shown, one or more types of physical SL channels (e.g., PSSCH, PSCCH), and/or PSFCH) may be rate-matched around resources of the one or more WUS monitoring occasions within the slot.

The slot format may also provide a gap between a WUS monitoring occasion and a PSSCH. For example, as shown in FIG. 13A, a new slot format defined for the WUS containing slot may include a WUS occupying a few symbols in the time-domain (including an Automatic Gain Control (AGC) symbol in front of the WUS and a gap symbol at the end of the WUS) while the remainder of the symbols in the slot are used for PSSCH/PSCCH, followed by a gap symbol.

As another example, as shown in FIG. 13B, a new slot format defined for the WUS containing slot may include multiple WUS monitoring occasions where each WUS occupies a few symbols in the time-domain (including an AGC symbol in front of the WUS and a gap symbol at the end of the WUS) and the plurality of such WUSs occupy the entire slot (e.g., three WUSs occupy the entire slot in FIG. 13B).

As another example, as shown in FIG. 13C, a new slot format defined for the WUS containing slot may include a WUS occupying a few symbols in the time-domain (including an ACG symbol in front of the WUS and a gap symbol at the end of the WUS), a PSSCH/PSCCH occupying a few symbols in the time-domain (followed by a gap symbol), and a PSFCH occupying a few symbols (followed by a gap symbol) in the time-domain, thereby filling the entire slot.

Figure 14:
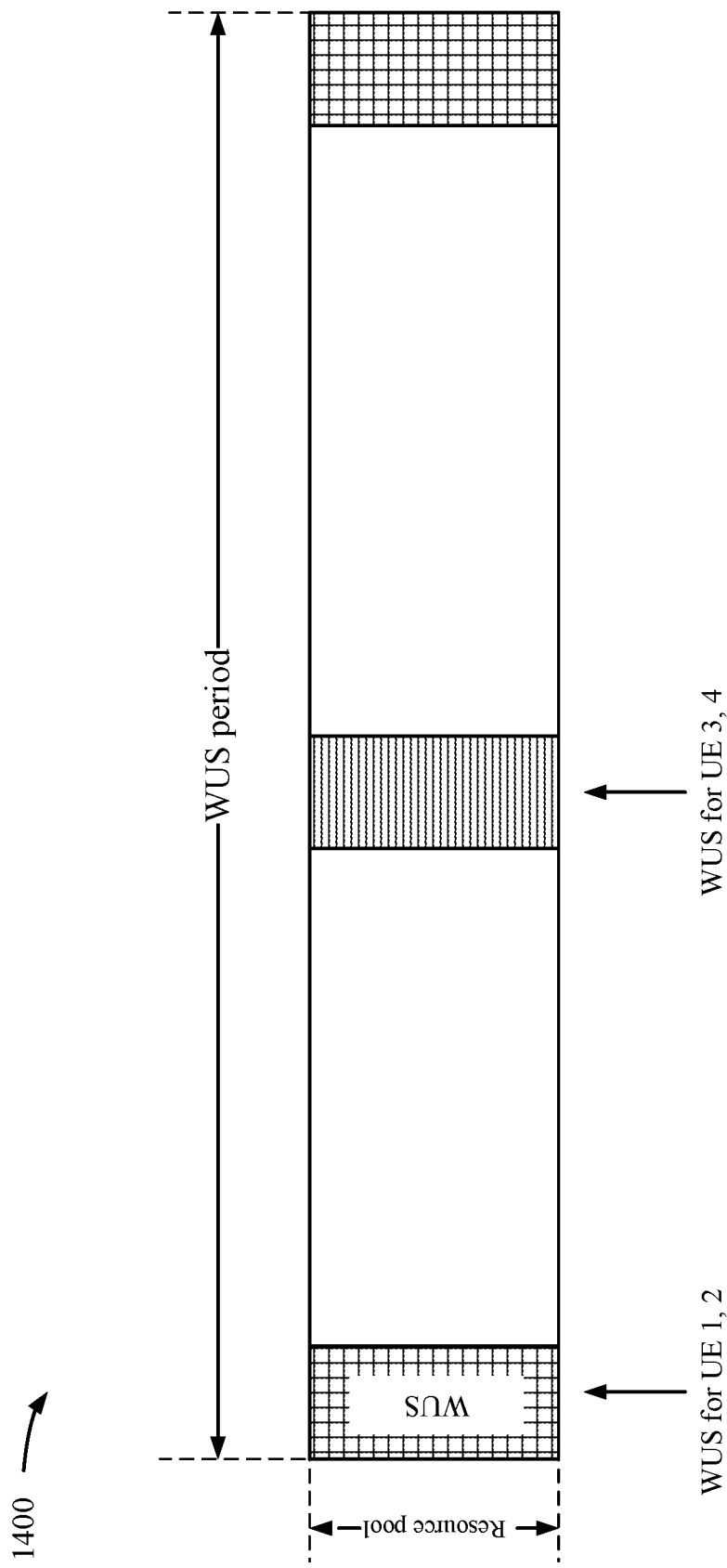
FIG. 14 illustrates an example subset of the available WUS resources to use for transmission and/or reception of WUSs, in accordance with certain aspects of the present disclosure.

Based on the WUS configuration, a pair of UEs may determine what WUS resources to use (for transmission or to monitor for transmission). As described above, the actual resources used by a pair/set of UEs to transmit and/or receive WUS(s) may only be a subset of the available WUS resources. In other words, the configured WUS occasions in the time domain may be much denser in time compared to the actual periodicity used by a pair/set of UEs. A pair/set of UEs (e.g., a SL WUS TX UE and a SL WUS RX UE) may use additional rules to determine what subset of the available WUS resource the pair/set may use/monitor as WUS occasions. This determination may be different for a pair of UEs in unicast versus a pair of UEs that receive the WUS resource configuration via broadcast, groupcast, or multi-cast signaling FIG. 14 illustrates an example subset of the available WUS resources to use for transmission and/or reception of WUSs, in accordance with certain aspects of the present disclosure. While the pair including UE 1 and UE 2 may wake up and monitor on the first WUS monitoring occasion, the pair including UE 3 and UE 4 may wake up and monitor on the second WUS monitoring occasion. Therefore, each pair may only use a subset of the available resources configured for WUS monitoring/transmission.

For cases where TX/RX UEs are communicating via broadcast, groupcast, or multi-cast signaling, one TX UE (e.g., SL WUS TX UE) may be in communication with multiple RX UEs (e.g., SL WUS RX UEs). Thus, a SL WUS may be transmitted from the TX UE to multiple RX UEs. In this case, the actual WUS resources/occasions used by the TX UE may be based on a layer 2 (L2) identifier (ID). Where the TX/RX UEs are communicating via broadcast, the L2 ID may be derived (i.e., determined by the TX UE) from an application triggering the UE to transmit a block message. Where the TX/RX UEs are communicating via groupcast, the L2 ID may be derived (i.e., determined by the TX UE) from group information ID established between the TX UE and the group of RX UEs. Where the TX/RX UEs are communicating via connection-less groupcast, the L2 ID may be derived (i.e., determined by the TX UE) based on a service type.

FIG. 15A illustrates communications between UEs in unicast mode, in accordance with certain aspects of the present disclosure. Where a pair of UEs are in unicast, the WUS resources/occasions to use/monitor may be based on a source/destination ID during a PC5 (SL interface) connection setup between the pair of UEs. Two approaches may be considered for the selection of WUS occasions/resources to use/monitor (e.g., indication of the resources a SL WUS TX UE may use to transmit a SL WUS and an indication of the occasions a SL WUS RX UE may monitor for a SL WUS).

FIGS. 15B and 15C illustrate example options for the selection of WUS resources during unicast communication between UEs, in accordance with certain aspects of the present disclosure. As shown in FIG. 15B, according to a first approach, a network entity may determine and signal an indication of the resources/occasions to use/monitor. In some examples, the network entity may determine the WUS resources/occasions based on resources selected/preferred by one of the SL WUS RX UEs, which are indicated to a SL WUS TX UE and relayed to the network entity.

As shown in FIG. 15C, according to a second approach, WUS resources/occasions may be selected by the UEs themselves (without a network entity). In some examples, the UEs may determine the WUS resources/occasions based on identifiers (IDs) of the SL WUS TX UE and the SL WUS RX UEs (e.g., source and destination IDs). Alternatively, in some other examples, either the SL WUS TX UE or the SL WUS RX UEs may indicate a preference of resources to use for SL WUS resources/occasions, and the other one of the SL WUS TX UE or the SL WUX RX UEs may make a final decision regarding the resources/occasions to use/monitor for SL WUS transmissions.

When WUS is jointly configured with DRX, the WUS occasions may be determined based on the DRX cycle and the DRX ON duration. For example, the WUS periodicity may be the same as the DRX cycle or the WUS periodicity may include multiple DRX cycles. The WUS monitoring occasions may occur (periodically) a threshold number of slots/symbols prior to the start of each SL DRX ON duration The TX/RX UEs may know to use the WUS occasion before each DRX ON duration. This approach is efficient in that it may eliminate the need for separate indication of WUS occasions.

In some cases, the SL WUS may be conveyed by the SL WUS TX UE via sidelink control information (SCI) or through a sequence. The SCI or the sequence may indicate at least one bit for a wakeup indication and one or more bits indicating at least one of a BWP, resource pool, or component carrier (CC) ID. A sequence-based WUS may contain ten or less bits, while an SCI-based WUS may be able to convey more than ten bits.

For both SCI-based WUS and sequence-based WUS, the SL WUS may be scrambled by at least one of a destination ID, a group destination ID, or a dedicated scrambling ID/Radio Network Temporary Identifier (RNTI). The dedicated scrambling ID may be configured for a pair of UEs for unicast, a group of UEs for managed group-cast, or for an application. Accordingly, the SL WUS may not need to convey explicit source IDs or destination IDs. This may help to reduce the payload size of the SL WUS. Moreover, scrambling the SL WUS may help prevent other UEs from waking unnecessarily. The SL WUS may only be intended for one SL WUS RX UE, and only the intended SL WUS RX UE may be able to decode the SL WUS. Thus, other UEs may not be able to decode/unscramble the SL WUS because they may not know the IDs of the SL WUS TX UE and the SL WUS RX UE.

Because SL involves multiple UEs, that may now know where the other is located, there may be an increased probability of collisions among transmitted SL WUSs. Accordingly, SL WUSs may be less reliable than Uu-WUSs. Therefore, according to certain aspects, a SL WUS RX UE may provide ACK feedback (e.g., HARQ-ACK feedback only) for a received SL WUS. Where no ACK is transmitted, a SL WUS TX UE may retransmit the SL WUS to increase reliability of SL WUSs.

Figure 16:
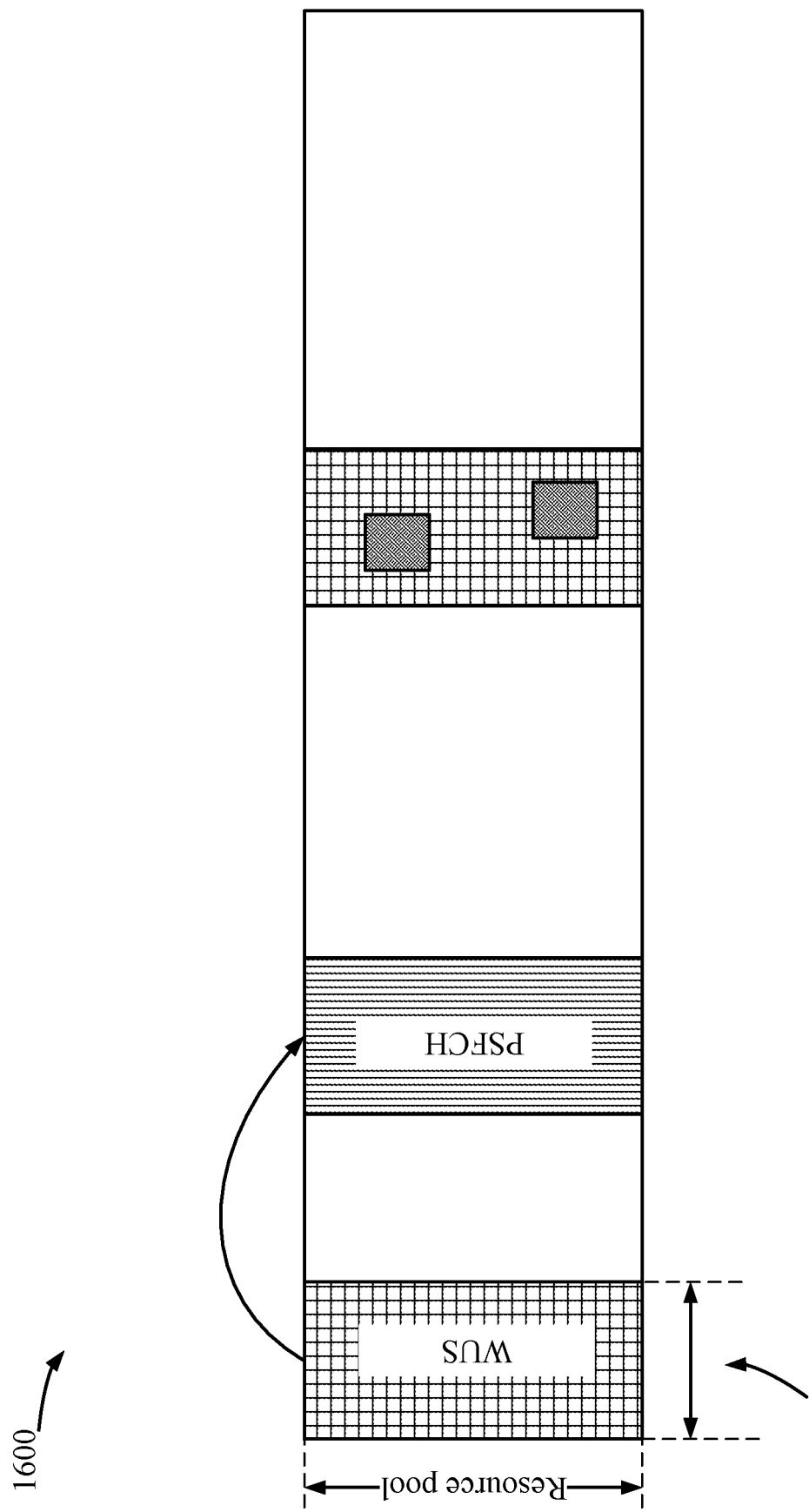
FIG. 16 illustrates an example where a physical sidelink feedback channel (PSFCH) may be used in a SL WUS configuration, in accordance with certain aspects of the present disclosure.

FIG. 16 illustrates an example where a PSFCH may be used in a SL WUS configuration, in accordance with certain aspects of the present disclosure. In some examples, as shown in FIG. 16, a SL WUS RX UE may monitor for a SL WUS in a WUS monitoring occasion. When no SL WUS is detected, according to certain aspects, the SL WUS RX UE may not transmit ACK feedback. Because no ACK feedback may be received by the SL WUS TX UE, the SL WUS TX UE may retransmit the SL WUS.

Alternatively, when an SL WUS is detected by the SL WUS RX UE, the SL WUS RX UE may transmit a PSFCH (feedback) back to the SL WUS TX UE.

Alternatively, in some examples, a SL WUS TX UE may be configured to transmit the SL WUS multiple times with repetitions (without the use of PSFCH feedback from the SL WUS RX UE). While this may increase the reliability of the SL WUS reception, this may increase the number of resources/repetitions needed to transmit the SL WUS more than once.

Figure 17:
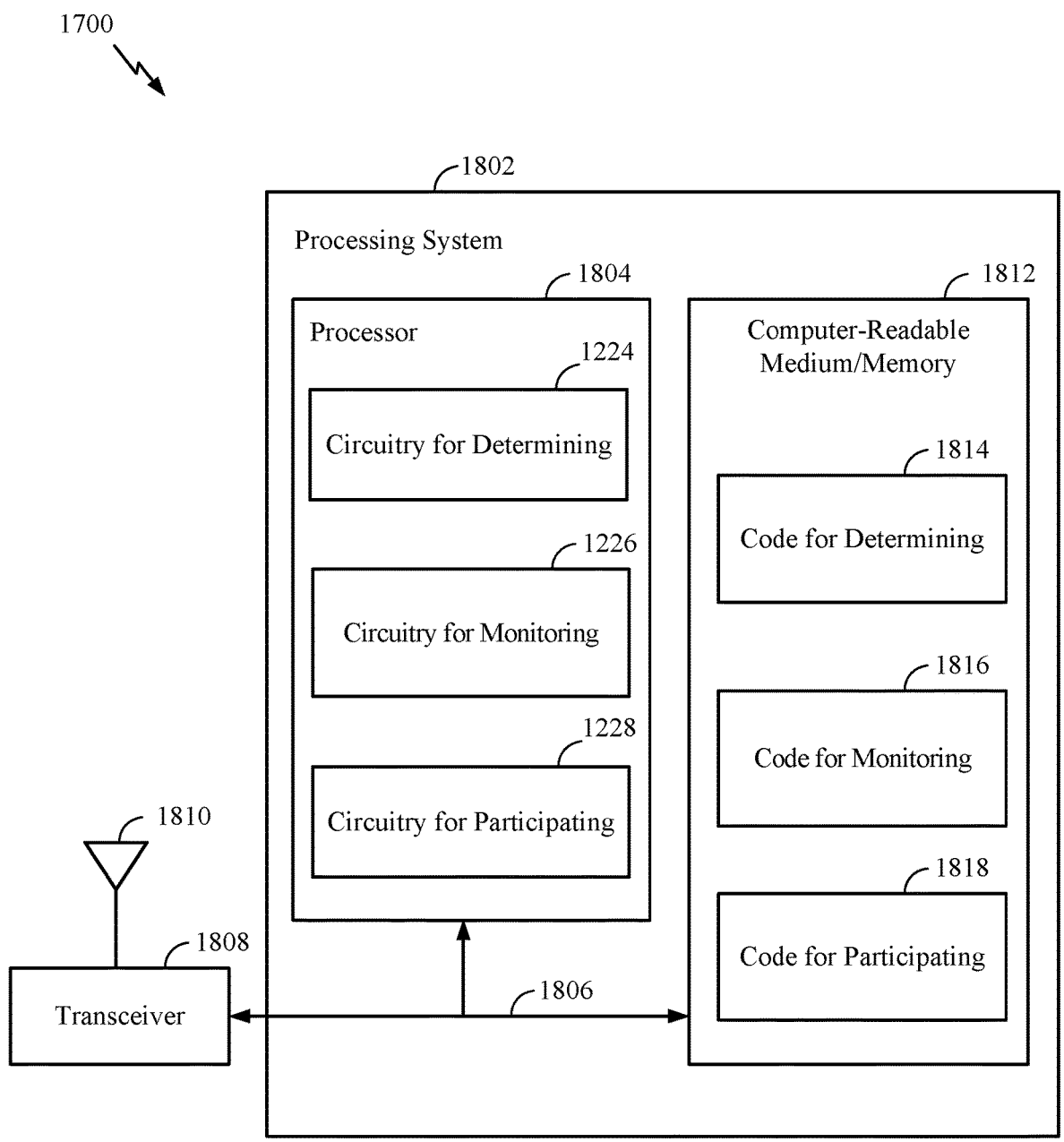
FIG. 17 illustrates an example communications device that may include various components configured to perform operations for the techniques disclosed herein in accordance with aspects of the present disclosure.

FIG. 17 illustrates a communications device 1700 that may include various components (e.g., corresponding to means-plus-function components) configured to perform operations for the techniques disclosed herein, such as the operations illustrated in FIG. 8. The communications device 1700 includes a processing system 1702 coupled to a transceiver 1708 (e.g., a transmitter and/or a receiver). The transceiver 1708 is configured to transmit and receive signals for the communications device 1700 via an antenna 1710, such as the various signals as described herein. The processing system 1702 may be configured to perform processing functions for the communications device 1700, including processing signals received and/or to be transmitted by the communications device 1700.

The processing system 1702 includes a processor 1704 coupled to a computer-readable medium/memory 1712 via a bus 1706. In certain aspects, the computer-readable medium/memory 1712 is configured to store instructions (e.g., computer-executable code) that when executed by the processor 1704, cause the processor 1704 to perform the operations illustrated in FIG. 8, or other operations for performing the various techniques discussed herein. In certain aspects, computer-readable medium/memory 1712 stores code 1714 for determining (e.g., for determining resources for SL WUS transmissions from a second UE, based on a WUS resource configuration); code 1716 for monitoring (e.g., for monitoring the resources for an SL WUS from the second UE); and code 1718 for participating (e.g., for participating in SL communications with the second UE if an SL WUS is detected during the monitoring). In certain aspects, the processor 1704 has circuitry configured to implement the code stored in the computer-readable medium/memory 1712. The processor 1704 includes circuitry 1724 for determining (e.g., for determining resources for SL WUS transmissions from a second UE, based on a WUS resource configuration); circuitry 1726 for monitoring (e.g., for monitoring the resources for an SL WUS from the second UE); and circuitry 1728 for participating (e.g., for participating in SL communications with the second UE if an SL WUS is detected during the monitoring).

Figure 18:
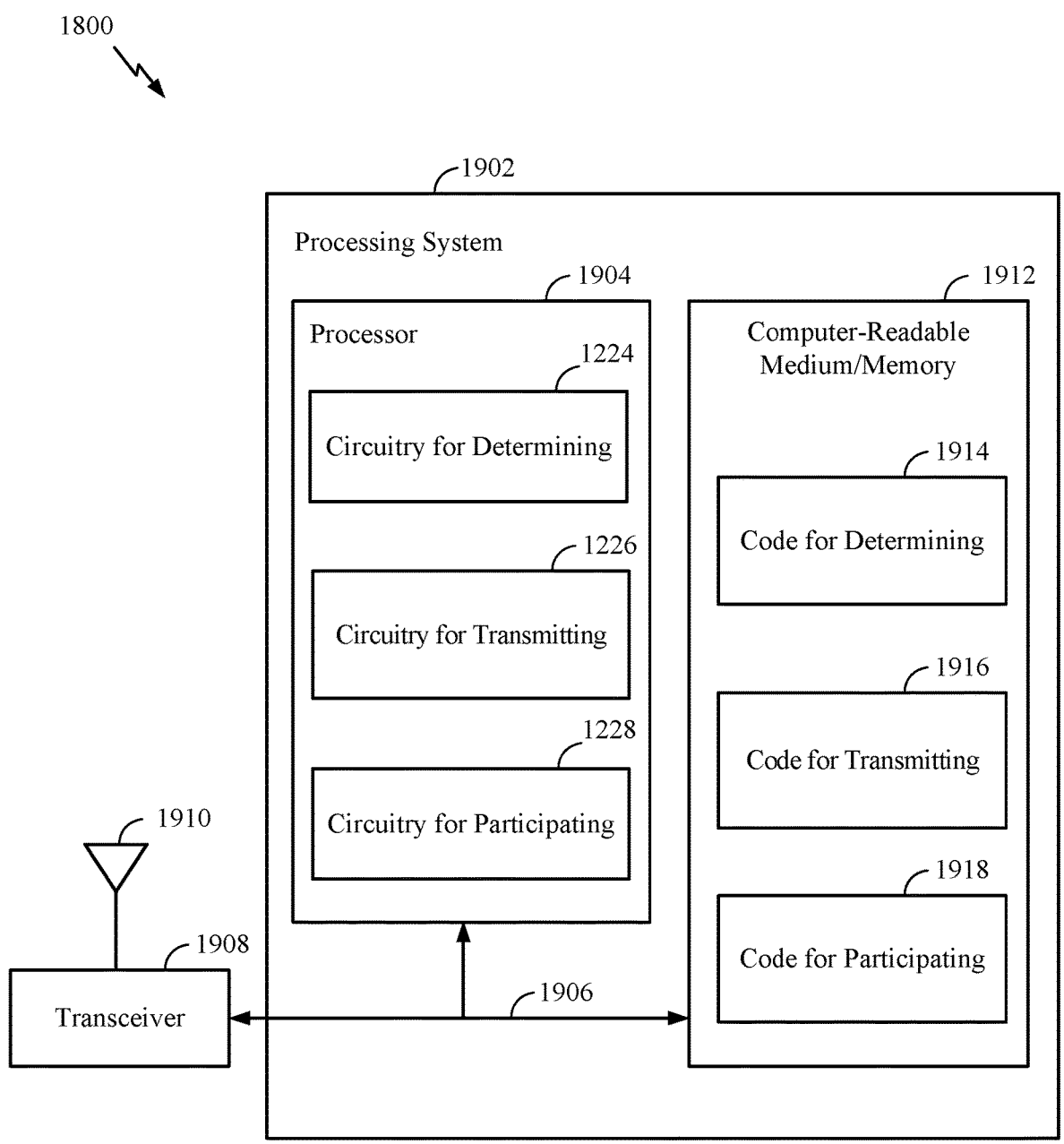
FIG. 18 illustrates an example communications device that may include various components configured to perform operations for the techniques disclosed herein in accordance with aspects of the present disclosure.

FIG. 18 illustrates a communications device 1800 that may include various components (e.g., corresponding to means-plus-function components) configured to perform operations for the techniques disclosed herein, such as the operations illustrated in FIG. 9. The communications device 1800 includes a processing system 1802 coupled to a transceiver 1808 (e.g., a transmitter and/or a receiver). The transceiver 1808 is configured to transmit and receive signals for the communications device 1800 via an antenna 1810, such as the various signals as described herein. The processing system 1802 may be configured to perform processing functions for the communications device 1800, including processing signals received and/or to be transmitted by the communications device 1800.

The processing system 1802 includes a processor 1804 coupled to a computer-readable medium/memory 1812 via a bus 1806. In certain aspects, the computer-readable medium/memory 1812 is configured to store instructions (e.g., computer-executable code) that when executed by the processor 1804, cause the processor 1804 to perform the operations illustrated in FIG. 9, or other operations for performing the various techniques discussed herein. In certain aspects, computer-readable medium/memory 1812 stores code 1814 for determining (e.g., for determining resources for SL WUS transmissions to a second UE, based on a WUS resource configuration); code 1816 for transmitting (e.g., for transmitting an SL WUS to the second UE); and code 1818 for participating (e.g., for participating in SL communications with the second UE). In certain aspects, the processor 1804 has circuitry configured to implement the code stored in the computer-readable medium/memory 1812. The processor 1804 includes circuitry 1824 for determining (e.g., for determining resources for SL WUS transmissions to a second UE, based on a WUS resource configuration); circuitry 1826 for transmitting (e.g., for transmitting an SL WUS to the second UE); and circuitry 1828 for participating (e.g., for participating in SL communications with the second UE).

Example Aspects

Aspect 1: An apparatus for wireless communication by a first user equipment (UE), comprising: a memory and at least one processor coupled to the memory, the memory and the at least one processor being configured to: determine resources for sidelink (SL) wake up signal (WUS) transmissions from a second UE, based on a WUS resource configuration; monitor the resources for an SL WUS from the second UE; and participate in SL communications with the second UE if an SL WUS is detected during the monitoring.

Aspect 2: The apparatus of Aspect 1, wherein the first UE is pre-configured with the WUS resource configuration.

Aspect 3: The apparatus of Aspect 1 or 2, wherein participating in SL communications with the second UE comprises transmitting SL transmissions to the second UE.

Aspect 4: The apparatus of any of Aspects 1-3, wherein participating in SL communications with the second UE comprises receiving SL transmissions from the second UE.

Aspect 5: The apparatus of Aspect 4, wherein participating in SL communications with the second UE further comprises: transmitting an SL WUS to the second UE; and transmitting SL transmissions to the second UE after transmitting the SL WUS to the second UE.

Aspect 6: The apparatus of any of Aspects 1-5, wherein participating in SL communications with the second UE comprises transmitting SL transmissions to the second UE without transmitting an SL WUS to the second UE.

Aspect 7: The apparatus of any of Aspects 1-6, wherein the WUS resource configuration indicates resources in at least one of a bandwidth part (BWP) or an SL carrier.

Aspect 8: The apparatus of Aspect 7, wherein: the memory and the at least one processor are configured to monitor for the SL WUS with a first radio frequency (RF) bandwidth setting according to the BWP or SL carrier; and the memory and the at least one processor are configured to participate in SL communications with the second UE with a second RF bandwidth setting wider than the first RF bandwidth setting.

Aspect 9: The apparatus of any of Aspects 1-8, wherein the WUS resource configuration indicates resources in a WUS resource pool shared by multiple UEs.

Aspect 10: The apparatus of Aspect 9, wherein the WUS resource configuration indicates one or more WUS monitoring occasions within a slot for the first UE to monitor.

Aspect 11: The apparatus of claim 10, wherein one or more types of physical SL channels are rate-matched around resources of the one or more WUS monitoring occasions within the slot.

Aspect 12: The apparatus of Aspect 11, wherein a format of the slot provides a gap between at least one of the one or more WUS monitoring occasions and a physical sidelink shared channel (PSSCH).

Aspect 13: The apparatus of any of Aspects 1-12, wherein the memory and the at least one processor are further configured to receive the WUS resource configuration, from the second UE, via broadcast, groupcast, or multi-cast signaling.

Aspect 14: The apparatus of Aspect 13, wherein determining the resources for monitoring SL WUS transmissions from the second UE is further based on a layer 2 (L2) identifier (ID) of the second UE.

Aspect 15: The apparatus of any of Aspects 1-14, wherein: the resources to monitor for SL WUS transmissions from the second UE are selected by at least one of the first UE or the second UE.

Aspect 16: The apparatus of Aspect 15, wherein the resources to monitor for SL WUS transmissions from the second UE are selected based on identifiers of the first and second UEs.

Aspect 17: The apparatus of Aspect 15 or 16, wherein: one of the first or second UEs indicates a preference of resources to use for SL WUS transmissions from the second UE; and the first or second UE which does not indicate the preference makes a final decision regarding the resources to use for SL WUS transmissions from the second UE.

Aspect 18: The apparatus of any of Aspects 15-17, wherein the memory and the at least one processor are further configured to: receive network signaling indicating the resources to monitor for SL WUS transmissions from the second UE.

Aspect 19: The apparatus of any of Aspects 1-18, wherein: the WUS resource configuration is configured jointly with a SL DRX configuration; and the memory and the at least one processor are configured to determine WUS occasions to monitor based on a SL DRX cycle and a SL DRX ON duration of the SL DRX configuration.

Aspect 20: The apparatus of Aspect 18, wherein the memory and the at least one processor are configured to: monitor the resources for an SL WUS from the second UE during a SL DRX OFF duration of the SL DRX configuration and remain in a low power state during the SL DRX ON duration of the SL DRX configuration unless an SL WUS is detected during the monitoring.

Aspect 21: The apparatus of any of Aspects 1-20, wherein the SL WUS is conveyed via at least one of sidelink control information (SCI) or a sequence.

Aspect 22: The apparatus of Aspect 21, wherein the SCI or the sequence indicates at least one bit for a wakeup indication and one or more bits indicating at least one of a bandwidth part (BWP), resource pool, or component carrier (CC) identifier (ID).

Aspect 23: The apparatus of Aspect 21 or 22, wherein the SCI or the sequence is scrambled by at least one of a destination ID, a group destination ID, or a dedicated scrambling ID.

Aspect 24: The apparatus of Aspect 23, wherein the dedicated scrambling ID is configured for at least one of the first and second UEs for unicast, for a group of UEs for managed group-cast, or for an application.

Aspect 25: The apparatus of any of Aspects 1-24, wherein the memory and the at least one processor are further configured to: provide acknowledgment (ACK) feedback for the SL WUS.

Aspect 26: The apparatus of any of Aspects 1-25, wherein the SL WUS is transmitted with multiple repetitions within a WUS occasion.

Aspect 27: An apparatus for wireless communication by a second user equipment (UE), comprising: a memory and at least one processor coupled to the memory, the memory and the at least one processor being configured to: determine resources for sidelink (SL) wake up signal (WUS) transmissions to a first UE, based on a WUS resource configuration; transmit an SL WUS to the first UE on the determined resources; and participate in SL communications with the first UE after transmitting the SL WUS.

Aspect 28: The apparatus of Aspect 27, wherein the WUS resource configuration indicates resources in at least one of a WUS resource pool shared by multiple UEs, a bandwidth part (BWP) or a SL carrier.

Aspect 29: A method of wireless communication by a first user equipment (UE), comprising: determining resources for sidelink (SL) wake up signal (WUS) transmissions from a second UE, based on a WUS resource configuration; monitoring the resources for an SL WUS from the second UE; and participating in SL communications with the second UE if an SL WUS is detected during the monitoring.

Aspect 30: A method of wireless communication by a second user equipment (UE), comprising: determining resources for sidelink (SL) wake up signal (WUS) transmissions to a first UE, based on a WUS resource configuration; transmitting an SL WUS to the second UE on the determined resources; and participating in SL communications with the second UE after transmitting the SL WUS.

ADDITIONAL CONSIDERATIONS

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

The methods disclosed herein comprise one or more steps or actions for achieving the methods. The method steps and/or actions may be interchanged with one another. In other words, unless a specific order of steps or actions is specified, the order and/or use of specific steps and/or actions may be modified.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above can also be considered as examples of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 8 and/or FIG. 9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communication by a first user equipment (UE), comprising:
a memory comprising instructions; and
one or more processors configured, individually or in any combination, to execute the instructions and cause the apparatus to:
determine wake up signal (WUS) resources for sidelink (SL) WUS transmissions from a second UE, based on a WUS resource configuration, wherein the WUS resources correspond to WUS time-frequency resources;
determine a subset of the WUS resources to monitor based on a cast type associated with at least one of the first UE or the second UE;
monitor the subset of the WUS resources for an SL WUS from the second UE; and
participate in SL communications with the second UE if an SL WUS is detected during the monitoring.

2. The apparatus of claim 1, wherein the first UE is pre-configured with the WUS resource configuration.

3. The apparatus of claim 1, wherein the one or more processors are configured, individually or in any combination, to execute the instructions and cause the apparatus to participate in SL communications with the second UE by transmitting SL transmissions to the second UE.

4. The apparatus of claim 1, wherein the one or more processors are configured, individually or in any combination, to execute the instructions and cause the apparatus to participate in SL communications with the second UE by receiving SL transmissions from the second UE.

5. The apparatus of claim 4, wherein the one or more processors are configured, individually or in any combination, to execute the instructions and cause the apparatus to participate in SL communications with the second UE further comprises by:
- transmitting an SL WUS to the second UE; and
- transmitting SL transmissions to the second UE after transmitting the SL WUS to the second UE.

6. The apparatus of claim 1, wherein the one or more processors are configured, individually or in any combination, to execute the instructions and cause the apparatus to participate in SL communications with the second UE by transmitting SL transmissions to the second UE without transmitting an SL WUS to the second UE.

7. The apparatus of claim 1, wherein the WUS resource configuration indicates WUS resources in at least one of a bandwidth part (BWP) or an SL carrier.

8. The apparatus of claim 7, wherein:
- the one or more processors are configured, individually or in any combination, to execute the instructions and cause the apparatus to monitor for the SL WUS with a first radio frequency (RF) bandwidth setting according to the BWP or SL carrier; and
- the one or more processors are configured, individually or in any combination, to execute the instructions and cause the apparatus to participate in SL communications with the second UE with a second RF bandwidth setting wider than the first RF bandwidth setting.

9. The apparatus of claim 1, wherein the WUS resource configuration indicates WUS resources in a WUS resource pool shared by multiple UEs.

10. The apparatus of claim 9, wherein the WUS resource configuration indicates one or more WUS monitoring occasions within a slot for the first UE to monitor.

11. The apparatus of claim 10, wherein one or more types of physical SL channels are rate-matched around WUS resources of the one or more WUS monitoring occasions within the slot.

12. The apparatus of claim 11, wherein a format of the slot provides a gap between at least one of the one or more WUS monitoring occasions and a physical sidelink shared channel (PSSCH).

13. The apparatus of claim 1, wherein the one or more processors are configured, individually or in any combination, to execute the instructions and cause the apparatus to:
- receive the WUS resource configuration, from the second UE, via broadcast, groupcast, or multi-cast signaling.

14. The apparatus of claim 13, wherein the one or more processors are configured, individually or in any combination, to execute the instructions and cause the apparatus to determine the subset of the WUS resources for monitoring SL WUS transmissions from the second UE further based on a layer 2 (L2) identifier (ID) of the second UE.

15. The apparatus of claim 1, wherein:
- the subset of the WUS resources to monitor for SL WUS transmissions from the second UE are selected by at least one of the first UE or the second UE during a connection setup between the first UE and the second UE.

16. The apparatus of claim 15, wherein the subset of the WUS resources to monitor for SL WUS transmissions from the second UE are selected based on identifiers of the first and second UEs.

17. The apparatus of claim 15, wherein:
- one of the first or second UEs indicates a preference of the subset of the WUS resources to use for SL WUS transmissions from the second UE; and the first or second UE which does not indicate the preference makes a final decision regarding the subset of the WUS resources to use for SL WUS transmissions from the second UE.

18. The apparatus of claim 15, wherein the one or more processors are configured, individually or in any combination, to execute the instructions and cause the apparatus to:
- receive network signaling indicating the subset of the WUS resources to monitor for SL WUS transmissions from the second UE.

19. The apparatus of claim 1, wherein:
- the WUS resource configuration is configured jointly with a SL DRX configuration; and
- the one or more processors are configured, individually or in any combination, to execute the instructions and cause the apparatus to determine WUS occasions to monitor based on a SL DRX cycle and a SL DRX ON duration of the SL DRX configuration.

20. The apparatus of claim 19, wherein the one or more processors are configured, individually or in any combination, to execute the instructions and cause the apparatus to:
- monitor the subset of the WUS resources for an SL WUS from the second UE during a SL DRX OFF duration of the SL DRX configuration; and
- remain in a low power state during the SL DRX ON duration of the SL DRX configuration unless an SL WUS is detected during the monitoring.

21. The apparatus of claim 1, wherein the SL WUS is conveyed via at least one of sidelink control information (SCI) or a sequence.

22. The apparatus of claim 21, wherein the SCI or the sequence indicates at least one bit for a wakeup indication and one or more bits indicating at least one of a bandwidth part (BWP), resource pool, or component carrier (CC) identifier (ID).

23. The apparatus of claim 21, wherein the SCI or the sequence is scrambled by at least one of a destination ID, a group destination ID, or a dedicated scrambling ID.

24. The apparatus of claim 23, wherein the dedicated scrambling ID is configured for at least one of the first and second UEs for unicast, for a group of UEs for managed group-cast, or for an application.

25. The apparatus of claim 1, wherein the one or more processors are configured, individually or in any combination, to execute the instructions and cause the apparatus to:
- provide acknowledgment (ACK) feedback for the SL WUS.

26. The apparatus of claim 1, wherein the SL WUS is transmitted with multiple repetitions within a WUS occasion.

27. An apparatus for wireless communication by a second user equipment (UE), comprising:
- a memory comprising instructions; and
- one or more processors configured, individually or in any combination, to execute the instructions and cause the apparatus to:
  - determine wake up signal (WUS) resources for sidelink (SL) WUS transmissions to a first UE, based on a WUS resource configuration, wherein the WUS resources correspond to WUS time-frequency resources;
  - determine a subset of the WUS resources to use for the SL WUS transmissions based on a cast type associated with at least one of the first UE or the second UE;
  - transmit an SL WUS to the first UE on the determined subset of the WUS resources; and participate in SL communications with the first UE after transmitting the SL WUS.

28. The apparatus of claim 27, wherein the WUS resource configuration indicates WUS resources in at least one of a WUS resource pool shared by multiple UEs, a bandwidth part (BWP) or a SL carrier.

29. A method of wireless communication by a first user equipment (UE), comprising:
- determining wake up signal (WUS) resources for sidelink (SL) WUS transmissions from a second UE, based on a WUS resource configuration, wherein the WUS resources correspond to WUS time-frequency resources;
- determining a subset of the WUS resources to monitor based on a cast type associated with at least one of the first UE or the second UE;
- monitoring the subset of the WUS resources for an SL WUS from the second UE; and
- participating in SL communications with the second UE if an SL WUS is detected during the monitoring.

30. A method of wireless communication by a second user equipment (UE), comprising:
- determining wake up signal (WUS) resources for sidelink (SL) WUS transmissions to a first UE, based on a WUS resource configuration, wherein the WUS resources correspond to WUS time-frequency resources;
- determining a subset of the WUS resources to use for the SL WUS transmissions based on a cast type associated with at least one of the first UE or the second UE;
- transmitting an SL WUS to the second UE on the determined subset of the WUS resources; and
- participating in SL communications with the second UE after transmitting the SL WUS.

* * * * *